US011789312B2

(12) United States Patent
Yasunaga et al.

(10) Patent No.: US 11,789,312 B2
(45) Date of Patent: Oct. 17, 2023

(54) LIGHTING DEVICE AND DISPLAY DEVICE

(71) Applicant: Sharp Display Technology Corporation, Kameyama (JP)

(72) Inventors: Hirotoshi Yasunaga, Kameyama (JP); Hisashi Watanabe, Kameyama (JP); Takeshi Masuda, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 17/987,803

(22) Filed: Nov. 15, 2022

(65) Prior Publication Data

US 2023/0168540 A1    Jun. 1, 2023

(30) Foreign Application Priority Data

Nov. 29, 2021 (JP) .................................. 2021-192675

(51) Int. Cl.
*G02F 1/13357* (2006.01)
*F21V 8/00* (2006.01)

(52) U.S. Cl.
CPC ..... *G02F 1/133606* (2013.01); *G02B 6/0076* (2013.01); *G02F 1/133605* (2013.01); *G02F 1/133603* (2013.01)

(58) Field of Classification Search
CPC ................ G02B 6/0055; G02B 6/0076; G02F 1/133603; G02F 1/133605; G02F 1/133606; G02F 1/133614; G02F 1/133611
See application file for complete search history.

(56) References Cited

U.S. PATENT DOCUMENTS

| | | | |
|---|---|---|---|
| 2008/0117630 A1 | 5/2008 | Durvasula et al. | |
| 2017/0160591 A1* | 6/2017 | Cho ................... | G02F 1/133606 |
| 2019/0369442 A1* | 12/2019 | Zhang ............... | G02F 1/133606 |
| 2020/0159078 A1* | 5/2020 | Watanabe ......... | G02F 1/136209 |

FOREIGN PATENT DOCUMENTS

JP          2008147174 A      6/2008

* cited by examiner

*Primary Examiner* — Erin Kryukova
(74) *Attorney, Agent, or Firm* — ScienBiziP, P.C.

(57) ABSTRACT

According to an aspect of the disclosure, a lighting device includes: a plurality of light sources; and a plurality of optical sheets disposed to be stacked at a position away from the plurality of light sources. The plurality of optical sheets include a first optical sheet and a second optical sheet. Each of the first optical sheet and the second optical sheet has a unit region that modulates light emitted from a light source for each of the plurality of light sources. The unit region includes a modulation region including a light source region facing the light source, and having a relatively high modulation action of the light as compared with other regions.

19 Claims, 12 Drawing Sheets

LIGHTING DEVICE AND DISPLAY DEVICE

CROSS-REFERENCE TO RELATED APPLICATIONS

This application claims the benefit of priority to Japanese Patent Application Number 2021-192675 filed on Nov. 29, 2021. The entire contents of the above-identified application are hereby incorporated by reference.

BACKGROUND

The present disclosure relates to a lighting device and a display device.

TECHNICAL FIELD

As a backlight system used in a liquid crystal display device or the like, for example, the one described in Japanese Unexamined Patent Application Publication No. 2008-147174 is known. In Japanese Unexamined Patent Application Publication No. 2008-147174, a configuration is disclosed in which a light scattering body, in which a plurality of light adjusting dots that improve the uniformity of brightness are formed in a pattern on a base, is disposed between a plurality of light sources and a light valve, such that the brightness of the lighting from the plurality of light sources is equalized. Further, it is disclosed that a plurality of light scattering bodies having different materials and thicknesses may be disposed.

When the position of the light scattering body in which the light adjusting dots are formed in a pattern shape is deviated with respect to the light source, the effect of equalizing the brightness can be greatly reduced. The positional deviation of the light scattering body may be caused by a manufacturing error, an assembly error, thermal expansion due to heat generation of the LED, or the like. In a case where the plurality of light scattering bodies are used by being stacked, when the position of any of the light scattering bodies is deviated, it is possible that the brightness equalization function of the other light scattering bodies is impaired.

The present disclosure has been made in view of the above circumstances, and it is desirable to effectively suppress brightness unevenness due to the light source although the positional deviation of an optical sheet occurs.

SUMMARY (1) A lighting device according to an aspect of the present disclosure includes a plurality of light sources; and a plurality of optical sheets disposed to be stacked at a position away from the plurality of light sources, wherein the plurality of optical sheets include a first optical sheet and a second optical sheet, each of the first optical sheet and the second optical sheet has a unit region that modulates light emitted from a light source for each of the plurality of light sources, the unit region includes a modulation region including a light source region facing the light source, and having a relatively high modulation action of the light as compared with other regions, and a first modulation region, which is the modulation region provided on the first optical sheet, and a second modulation region, which is the modulation region provided on the second optical sheet, are superimposed at least in the light source regions of each other.

(2) In one embodiment of the present disclosure, in addition to the configuration of the above (1), the plurality of optical sheets further include a third optical sheet having the unit region including a third modulation region, which is the modulation region, for each of the plurality of light sources, and the third modulation region provided on the third optical sheet is superimposed on the first modulation region and the second modulation region at least in the light source regions of each other.

(3) In one embodiment of the present disclosure, in addition to the configuration of the above (1) or (2), a modulation action of light included in the first optical sheet and the second optical sheet includes at least one of reflection and scattering of light.

(4) In one embodiment of the present disclosure, in addition to the configuration of one of the above (1) to (3), the modulation region has a size equal to or more than twice a size of the light source region.

(5) In one embodiment of the present disclosure, in addition to the configuration of one of the above (1) to (4), the first modulation region in the first optical sheet and the second modulation region in the second optical sheet have the same shape and position.

(6) In one embodiment of the present disclosure, in addition to the configuration of one of the above (1) to (4), the first modulation region in the first optical sheet and the second modulation region in the second optical sheet have the same shape, and are provided at least at different positions within a range in which the light source regions of each other are superimposed.

(7) In one embodiment of the present disclosure, in addition to the configuration of one of the above (1) to (4), the first modulation region in the first optical sheet and the second modulation region in the second optical sheet are alike in shape to each other, and entirety of the relatively small modulation region is superimposed on the relatively large modulation region.

(8) In one embodiment of the present disclosure, in addition to the configuration of one of the above (1) to (4), the first modulation region in the first optical sheet and the second modulation region in the second optical sheet have different shapes from each other, and centers of each other are superimposed.

(9) In one embodiment of the present disclosure, in addition to the configuration of one of the above (1) to (8), the first optical sheet is disposed at a position closer to the plurality of light sources than the second optical sheet, and the first modulation region in the first optical sheet has a configuration that makes the modulation action higher as compared with the second modulation region in the second optical sheet.

(10) In one embodiment of the present disclosure, in addition to the configuration of one of the above (1) to (9), at least one of the first optical sheet and the second optical sheet includes a sub-modulation region, which is a region having the high modulation action of the light, provided at a position different from the modulation region in each of the unit regions.

(11) In one embodiment of the present disclosure, in addition to the configuration of one of the above (1) to (10), both the first optical sheet and the second optical sheet include a base, and a modulation pattern provided at a position corresponding to the modulation region of the base and having an action of modulating the light emitted from the light source.

(12) In one embodiment of the present disclosure, in addition to the configuration of the above (11), the base is a diffuser sheet made of a synthetic resin sheet that has a light scattering property by containing particles.

(13) In one embodiment of the present disclosure, in addition to the configuration of the above (11) or (12), the base has uneven portions on one surface.

(14) A lighting device according to an aspect of the present disclosure includes the lighting device of the above (1) to (13), and a display panel that displays an image by using light emitted from the lighting device.

According to the present disclosure, a brightness unevenness due to the light source is effectively suppressed although the positional deviation of an optical sheet occurs.

DESCRIPTION OF THE EMBODIMENTS

First Embodiment

Figure 1:
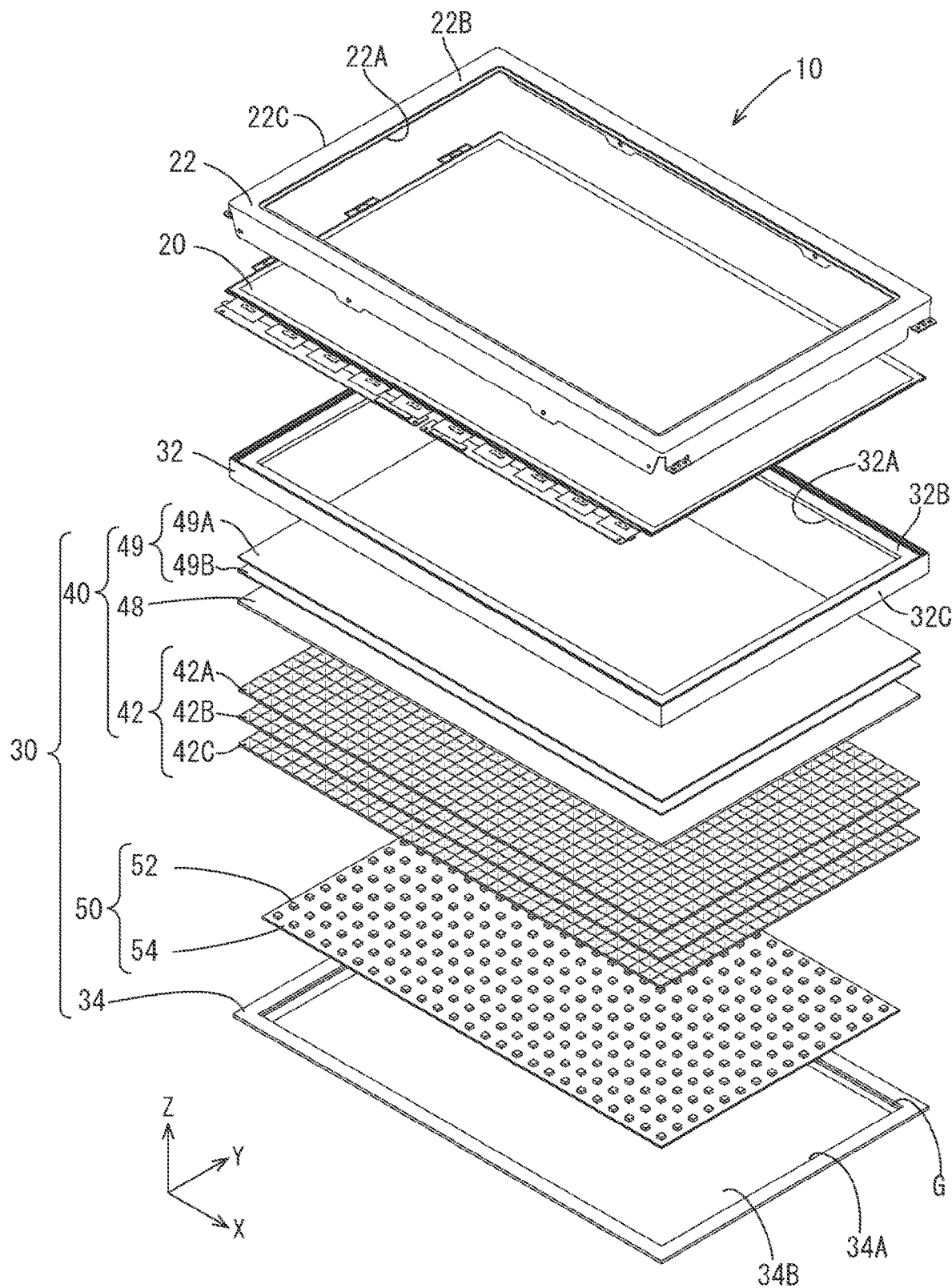
FIG. 1 is an exploded perspective view illustrating the structure of a liquid crystal display device according to an embodiment.

Hereinafter, desirable embodiments of the present technology will be described with reference to FIGS. 1 to 9 as appropriate. A portion of the drawing illustrates an X-axis, a Y-axis, and a Z-axis, and each axis is drawn along the width direction, the vertical direction, and the thickness direction, respectively. Further, in the Z-axis direction, the side of a liquid crystal panel 20 is the front side, and the side of a backlight device 30 is the back side.

Figure 2:
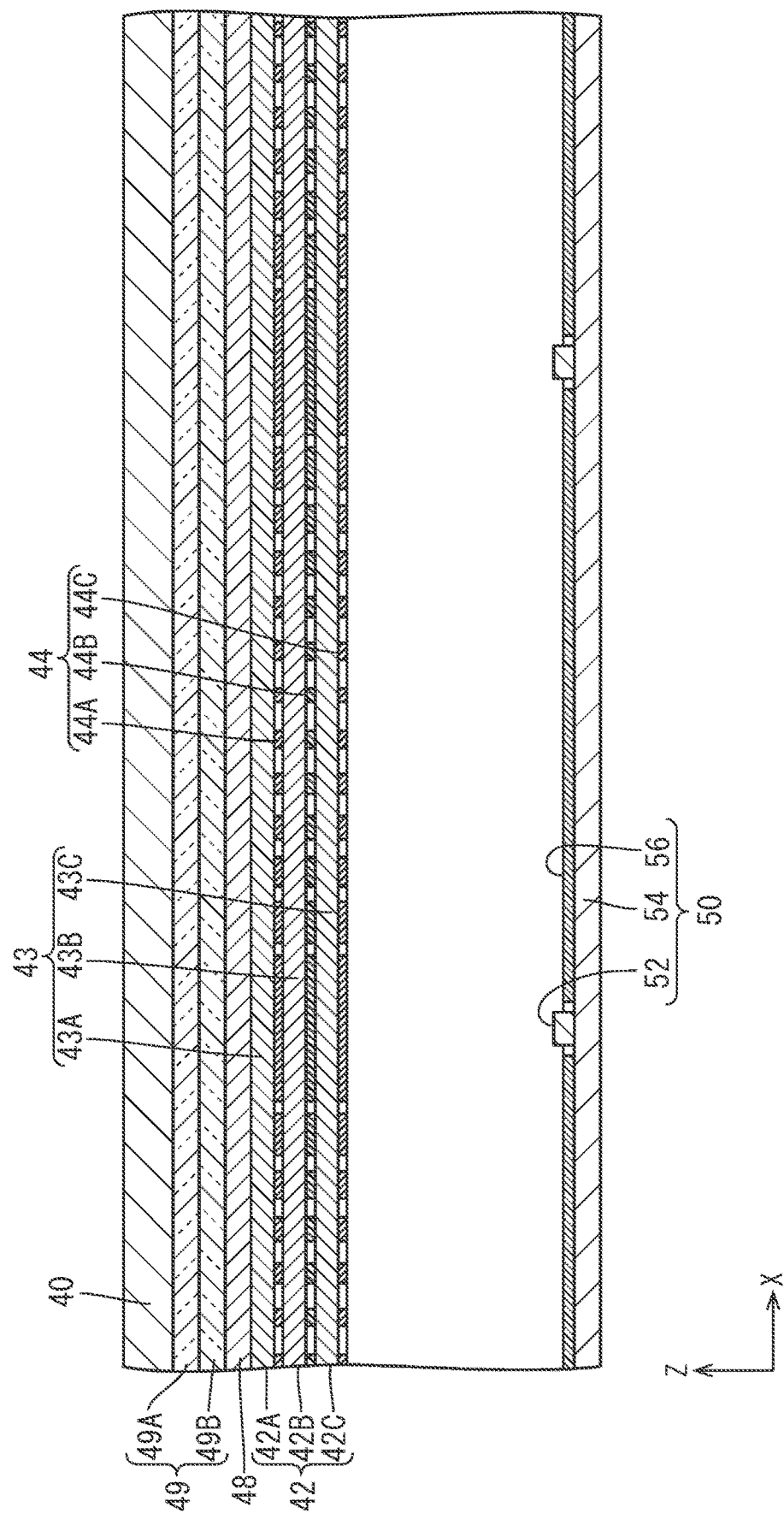
FIG. 2 is a partial cross-sectional view illustrating a structure of a backlight device according to an embodiment.

As illustrated in FIGS. 1 and 2, a liquid crystal display device 10 (an example of a display device) of the present embodiment generally includes the liquid crystal panel 20 (an example of a display panel) and the backlight device 30 (an example of a lighting device), and a bezel 22.

The liquid crystal panel 20 is an element that displays an image by using the light emitted from the backlight device 30. The liquid crystal panel 20 has a horizontally long rectangular shape as a whole, and is sandwiched between the bezel 22 and the backlight device 30 in a posture in which the display surface faces the front side. The liquid crystal panel 20 includes a pair of transparent substrates disposed at prescribed intervals, and a liquid crystal layer enclosed between the pair of substrates. One substrate is called an active matrix substrate or the like, and on the surface facing the other, a source wiring and a gate wiring orthogonal to each other, a switching element (for example, TFT) connected to these, a transparent pixel electrode connected to the switching element, a capacitive wiring parallel to gate wiring, and an alignment film laminated to cover them are provided. The other substrate is called a facing substrate, and is provided with a color filter in which pixels such as red (R), green (G), blue (B) and a black matrix separating the pixels are disposed in a prescribed arrangement, and a transparent electrode and an alignment film laminated to cover the filter. A polarizing plate is provided on the outer surface of both substrates. The liquid crystal panel 20 is controlled to display the prescribed image by supplying a prescribed image signal (for example, a scanning signal to the gate wiring, a data signal to the source wiring, and a capacitive signal to the capacitive wiring) to the wiring provided on the active matrix substrate.

The backlight device 30 is an element that irradiates the liquid crystal panel 20 with light. The backlight device 30 has a horizontally long rectangular shape that is one size smaller than the liquid crystal panel 20, and is disposed on the back side of the liquid crystal panel 20 to overlap the liquid crystal panel 20. The backlight device 30 includes an LED substrate 50 as a planar light source and an optical sheet 40. The backlight device 30 additionally includes a frame 32 and a chassis 34 to accommodate the LED substrate 50 and the optical sheet 40.

The LED substrate 50 includes a plurality of light emitting diodes (LED) 52 as a light source, a substrate 54, and a reflective layer 56. The substrate 54 is an element that supports the plurality of LEDs 52 in a prescribed disposition, and has a mounting surface 52A on which the plurality of LEDs 52 are mounted. The substrate 54 has a shape substantially corresponding to the liquid crystal panel 20. As the substrate 54, a metal substrate (an aluminum-based substrate, a copper-based substrate, and an iron-based substrate) having an insulating layer on the mounting surface 52A, an insulating resin substrate, or the like can be used. The substrate 54 may be a rigid substrate having no flexibility or may be a flexible substrate having flexibility. The substrate 54 of the present embodiment is a printed wiring metal substrate in which a white glass epoxy resin layer as an insulating layer and a wiring pattern made of a metal film such as copper foil are laminated in the above order on the front side surface of an aluminum plate having high heat dissipation. The LED substrate 50 can supply power to each LED 52 through the wiring pattern. The backlight device 30 of the present embodiment is configured to perform local dimming (partial dimming) control for dimming the LED 52 independently for each of several pre-divided dimming regions, and the substrate 54 includes a wiring pattern capable of supplying power to the LED 52 for each dimming region.

Figure 3:
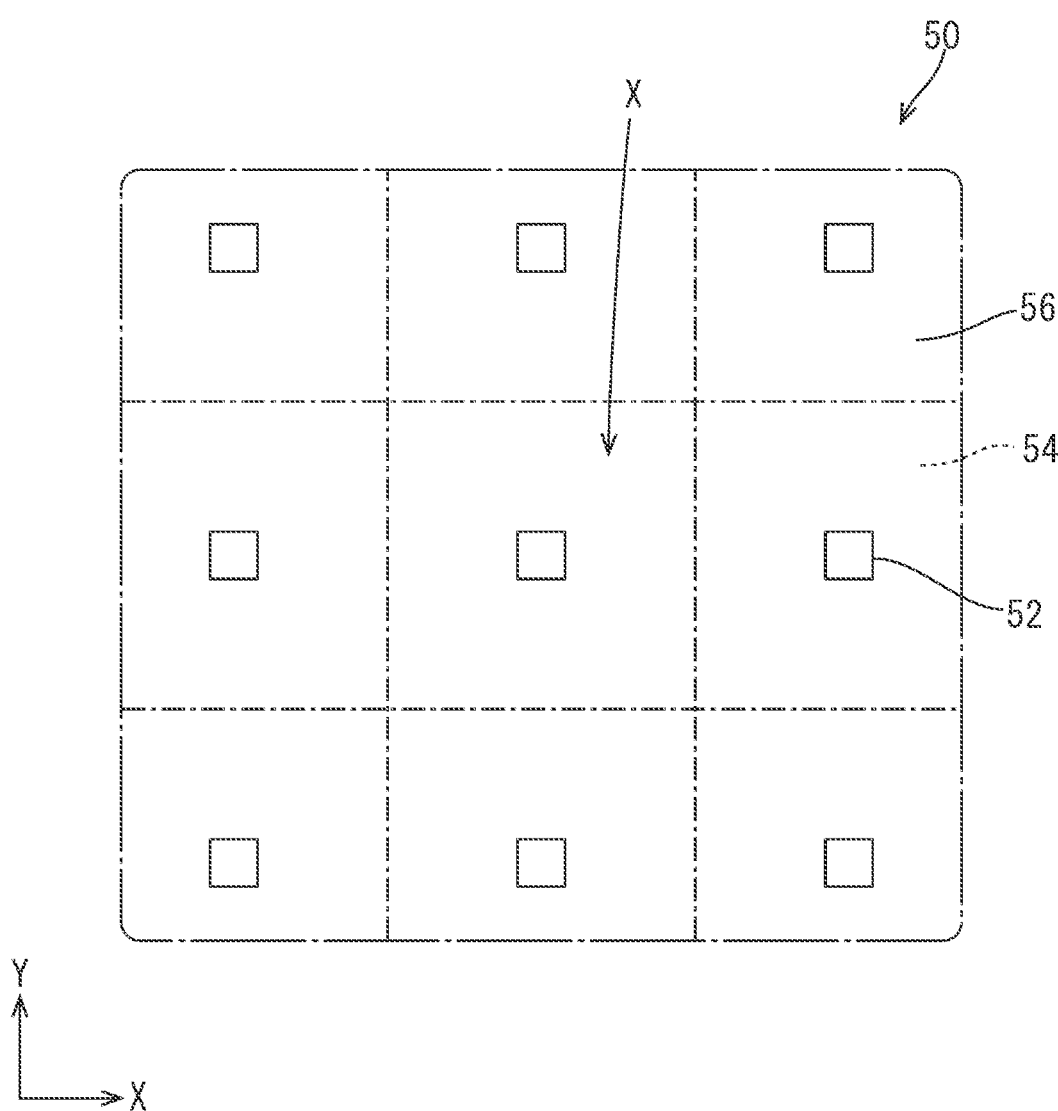
FIG. 3 is a front view of an LED substrate provided in the backlight device of FIG. 2.

Each of the plurality of LEDs 52 emits light when electric power is supplied. The LED 52 is a point light source by itself. Each of the plurality of LEDs 52 of the present embodiment is a blue monochromatic light emitting diode. The blue LED contains a compound semiconductor such as InGaN as a light emitting material, and emits blue monochromatic light that is visible light in a wavelength range of energy corresponding to a band gap (for example, about 400 nm to 500 nm) when a voltage is applied in the forward direction. As illustrated in FIG. 3, for example, the plurality of LEDs 52 are arranged at a prescribed interval along the vertical direction and the horizontal direction. Each of the plurality of LEDs 52 may have any shape suitable for surface mounting on the substrate 54, that is, a so-called top view type, a surface mount type, a chip scale package (CSP) type, a flip chip mount type, or the like. In the present embodiment, as the plurality of LEDs 52, so-called mini LEDs, which are bare chip LEDs having a maximum dimension of 1 mm or less and a substantially rectangular parallelepiped shape, are adopted. In the mini LED, the optical axis direction in which the light emission intensity is highest is the front side (that is, the +Z-axis direction). The mini LED is not obligatorily limited thereto, but the dimension of the long side is about 0.3 to 0.6 mm (for example, 0.6 mm), and the dimension of the other side is about 0.1 to 0.3 mm (for example, 0.3 mm).

The reflective layer 56 is provided on a portion, which is not provided with the plurality of LEDs 52, of the front side surface (mounting surface) of the substrate 54. The reflective layer 56 is an element that reflects the light that arrives the mounting surface from the plurality of LEDs 52 to the front side in order to improve the utilization efficiency of the light emitted from the plurality of LEDs 52. As the reflective layer 56, for example, a specular reflective sheet having a total light reflectance of 90% or more, or a foamed resin sheet made of white foamed PET or the like can be used. The reflective layer 56 in the present embodiment is constituted with, for example, an enhanced specular reflector (ESR) having a total light reflectance of 99% or more. By providing the reflective layer 56, it is possible to increase the illuminance of the backlight device 30 and reduce the power consumption. As the reflective layer 56, for example, a material of a sheet shape may be attached to the substrate 54 using an optical clear adhesive (OCA).

As illustrated by a phantom line in FIG. 3, for example, the mounting surface 52A of the LED substrate 50 can be evenly divided such that the LEDs 52 are disposed one by one. Hereinafter, the region is referred to as a unit LED region for convenience. In the present embodiment, the unit LED regions are arranged on the LED substrate 50 along the vertical direction and the horizontal direction.

The optical sheet 40 is an element that controls at least one element of an intensity, a color, a phase, a polarization, and a direction of light arriving from a light source. The optical sheet 40 of the present embodiment includes a reflective sheet 42, a wavelength conversion sheet 48, and other optical sheets 49. All of the optical sheets 40 have substantially the same shape as the liquid crystal panel 20, and have a horizontally long rectangular shape that is one size larger than the LED substrate 50.

The reflective sheet 42 is an element that reflects at least a portion of the light arriving from the LED 52 (light source) toward the LED substrate 50. More specifically, the reflective sheet 42 is a member to effectively scatter and reflect highly directional light emitted by the plurality of LEDs 52 provided on the LED substrate 50 in a plane. Hereinafter, the "reflection" referred to with respect to the reflective sheet 42 includes "scattered reflection". The reflective sheet 42 is disposed along the mounting surface at a position away from the LED substrate 50. In the present disclosure, the portion (projection portion) of the reflective sheet 42 facing each of the plurality of LEDs 52 of the LED substrate 50 is referred to as a light source region L. Further, the reflective sheet 42 can be divided for each LED 52 for each region in which the light arriving from the LED 52 is the largest. Hereinafter, the region is referred to as a unit region X for convenience. The unit region X can be configured, for example, as a region facing the unit LED region of the LED substrate 50. In the present embodiment, the reflective sheet 42 includes the number of the unit region X equal to the number of the LEDs 52, and the one unit region X includes the one light source region L. The light source region L is typically disposed at the center (the center of a plane) of the unit region X. The plurality of unit regions X are arranged along the vertical direction and the horizontal direction.

The reflective sheet 42 includes a base 43 and a reflective pattern layer 44 provided on the surface of the base 43. The base 43 is an element that supports the reflective pattern layer 44. The shape, configuration, and optical characteristics of the base 43 are not particularly limited as long as the shape, configuration, and optical characteristics thereof can support the reflective pattern layer 44 and can transmit the light emitted by the LED 52 as a whole. The base 43 may be, for example, various known optical sheets that exert some optical action on the light emitted by the LED 52 (light source). Further, the base 43 may be constituted with, for example, a material that does not exert an optical action on the light emitted by the LED 52. On the other hand, the reflective pattern layer 44 in the present embodiment is an element constituting the modulation region according to the present disclosure. The reflective pattern layer 44 is constituted with a material having a relatively high reflectance (an example of a modulation action) with respect to the light emitted by the LED 52 as compared with the base 43. With such a configuration, the reflective sheet 42 substantially has a higher reflectance with respect to light from the LED 52 in the portion provided with the reflective pattern layer 44 than in the portion without the reflective pattern layer 44.

In the present embodiment, for convenience, the base 43 is a homogeneous and smooth sheet constituted with a synthetic resin material that is transparent with respect to the light emitted by the LED 52, and does not bring a relevant optical action on the light emitted by the LED 52 (however, some refraction of light can occur). In this case, the reflective sheet 42 reflects the light emitted by the LED 52 at the portion in which the reflective pattern layer 44 is provided, and generally transmits the light from the LED 52 at the portion in which the reflective pattern layer 44 is not provided without reflecting the light. That is, the reflective sheet 42 includes a modulation region that reflects (an example of modulation) the light from the LED 52 at the portion in which the reflective pattern layer 44 is provided. The portion of the reflective sheet 42 provided with the reflective pattern layer 44 may or may not have transparency to the light emitted by the LED 52 in the thickness direction. The total light reflectance of the one reflective pattern layer 44 (JIS K 7375: 2008, the same applies hereinafter) is not limited thereto, but may be, for example, 30% or more and 60% or less (typically, about 50% or less).

The base 43 can be suitably constituted with, for example, a sheet made of a transparent synthetic resin. Examples of the transparent synthetic resin include an optical resin such as colorless and transparent polyethylene terephthalate (PET), polycarbonate (PC), acrylic resin, polyvinyl alcohol (PVA), and triacetyl cellulose (TAC). Further, the reflective pattern layer 44 in the present embodiment can be constituted with a material having a high reflectance with respect to the light emitted by the LED 52. Such materials can be suitably configured with a layer made of a metal (for example, aluminum, gold, silver, or the like) or a white pigment (for example, titanium oxide, or the like), or an optical sheet called an enhanced specular reflector (ESR) sheet or the like. The reflective pattern layer 44 can be formed, for example, by vapor-depositing the metal in a prescribed shape on the base 43, supplying a paint containing the white pigment and the binder, or attaching the ESR sheet. The vapor deposition method may be a physical vapor deposition method (PVD) such as ion plating, a chemical vapor deposition method (CVD) such as sputtering, or the like. The paint supply method may be a screen printing method, an inkjet printing method, a gravure printing method, a letterpress printing method, an offset printing method or the like. Among them, it is desirable to adopt a screen printing method in which plate preparation is relatively easy, or an inkjet printing method which is a plateless printing method. Examples of the ESR sheet include a sheet having a so-called optical multilayer film interference design in which a large number of nanometer-order thin layers having different refractive indexes are laminated to cause light interference reflection.

Figure 4A:
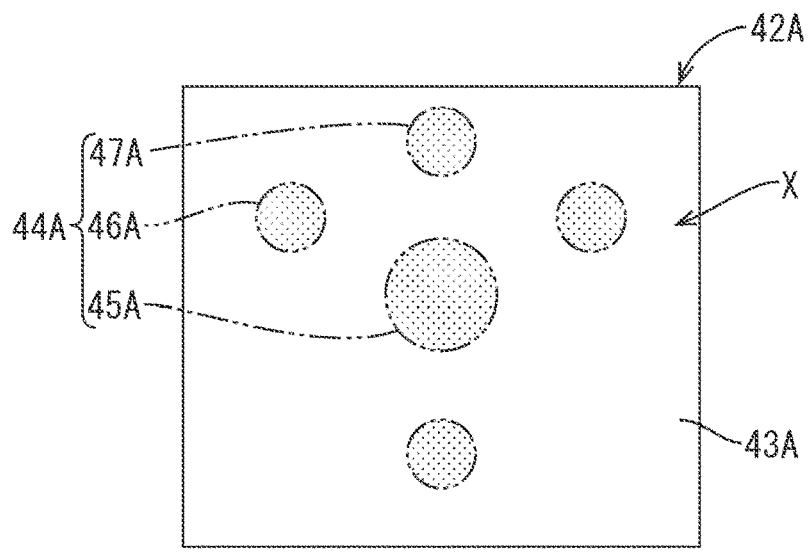
FIG. 4A is a front view illustrating a unit region of a first reflective sheet provided in the backlight device of FIG. 2.
Figure 4B:
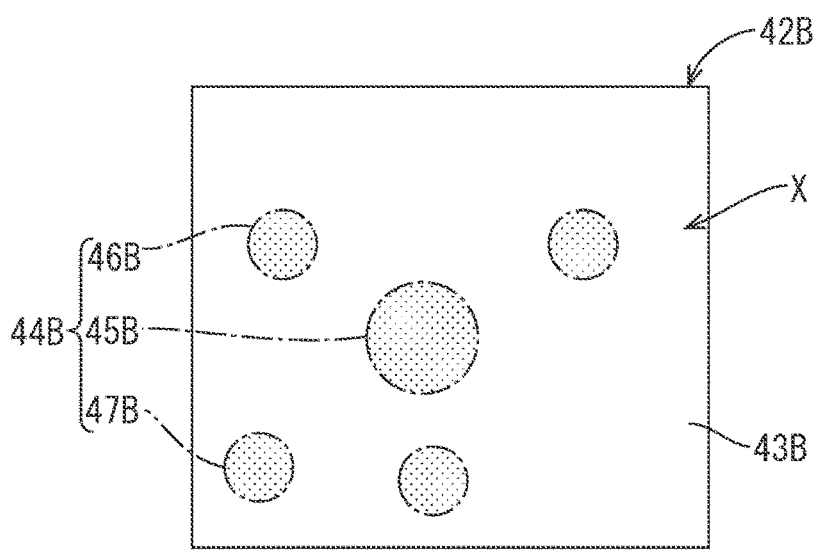
FIG. 4B is a front view illustrating a unit region of a second reflective sheet provided in the backlight device of FIG. 2.
Figure 4C:
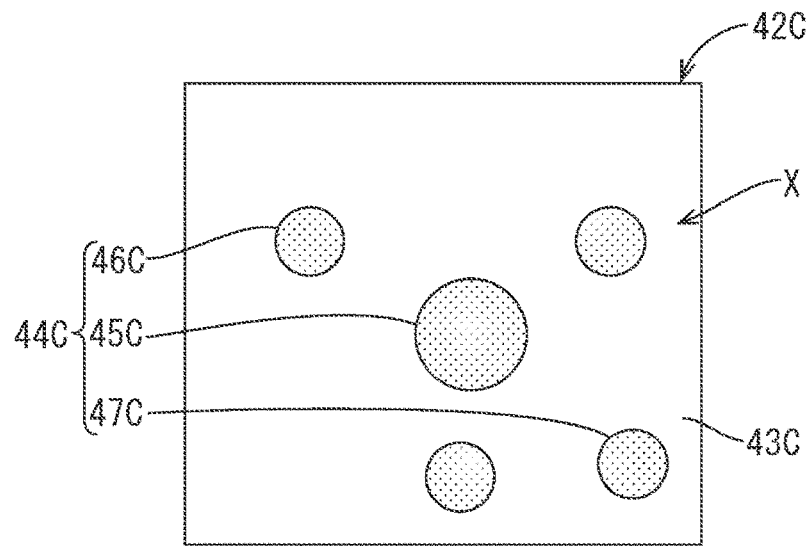
FIG. 4C is a front view illustrating a unit region of a third reflective sheet provided in the backlight device of FIG. 2.
Figure 5:
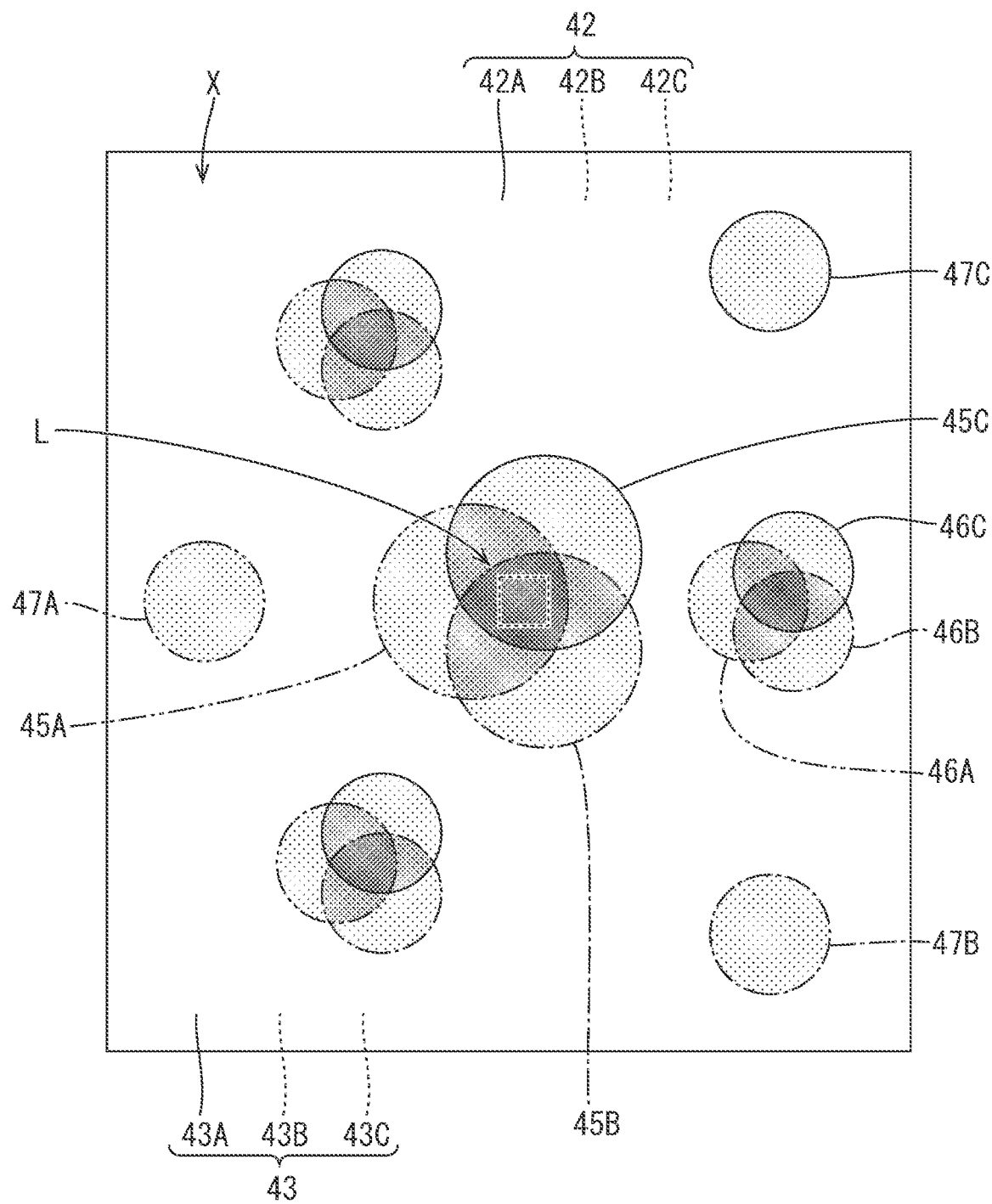
FIG. 5 is a front view illustrating a unit region when the three reflective sheets of FIGS. 4A to 4C are stacked.

The reflective sheet 42 of the present embodiment includes three reflective sheets, a first reflective sheet 42A, a second reflective sheet 42B, and a third reflective sheet 42C. The first reflective sheet 42A, the second reflective sheet 42B, and the third reflective sheet 42C are disposed in this order from the front side. FIGS. 4A to 4C show the one unit region X in the three reflective sheets 42A, 42B, and 42C, respectively. The first to third reflective sheets 42A, 42B, and 42C include bases 43A, 43B, and 43C, and reflective pattern layers 44A, 44B, and 44C, respectively. Further, the reflective pattern layers 44A, 44B, and 44C have three types of pattern layers of first reflective pattern layers 45A, 45B, and 45C, second reflective pattern layers 46A, 46B, and 46C, and third reflective pattern layers 47A, 47B, and 47C, respectively. As illustrated in FIG. 5, the three reflective sheets 42A, 42B, and 42C are typically disposed to be completely stacked with each other. Therefore, the reflective pattern layers 44A, 44B, and 44C may be configured to show the total light reflectance of, for example, about 30% or more and 100% or less (typically, 30% or more and 85% or less) when the three reflective sheets 42A, 42B, and 42C are stacked. Hereinafter, when it is relevant to distinguish between the three reflective sheets, the three reflective sheets are illustrated separately as the first reflective sheet 42A, the second reflective sheet 42B, and the third reflective sheet 42C, and are collectively referred to as the reflective sheet 42 when the matters common to the three reflective sheets are described.

The first reflective pattern layers 45A, 45B, and 45C are provided one by one in the one unit region X, and all of them have the same shape and have the same reflection performance. The second reflective pattern layers 46A, 46B, and 46C are provided three by three in the one unit region X, and all of them have the same shape and have the same reflection performance. The third reflective pattern layers 47A, 47B, and 47C are provided one by one in the one unit region X, and all of them have the same shape as the second reflective pattern layers 46A, 46B, and 46C, and have the same reflection performance as the second reflective pattern layers 46A, 46B, and 46C. The first reflective pattern layers 45A, 45B, and 45C have a relatively large area as compared with the second reflective pattern layers 46A, 46B, and 46C and the third reflective pattern layers 47A, 47B, and 47C.

In order to effectively reflect the light emitted from each LED 52, the reflective sheet 42 includes the first reflective pattern layers 45A, 45B, and 45C among the three pattern layers at a position including at least the light source region L for each of the unit regions X. The first reflective sheet 42A, the second reflective sheet 42B, and the third reflective sheet 42C are provided with the first reflective pattern layers 45A, 45B, and 45C at positions slightly deviated from each other. That is, although the first reflective pattern layers 45A, 45B, and 45C are superimposed at least in the light source region L, the first reflective pattern layers 45A, 45B, and 45C are disposed not to completely overlap each other. In the three reflective sheets 42 of the present embodiment, each of the first reflective pattern layers 45A, 45B, and 45C is provided such that the center of each faces a different direction for each 120°(=360°÷3 (the number of the reflective sheets)) radially about the light source region L and positioned at a place of a prescribed dimension away from the light source region L.

Each of the first reflective sheet 42A, the second reflective sheet 42B, and the third reflective sheet 42C of the present embodiment has the three second reflective pattern layers 46A, 46B, and 46C evenly around the first reflective pattern layers 45A, 45B, and 45C as the center. The second reflective pattern layers 46A, 46B, and 46C have the same disposition with respect to the first reflective pattern layers 45A, 45B, and 45C, respectively. Therefore, by shifting the first reflective sheet 42A, the second reflective sheet 42B, and the third reflective sheet 42C by prescribed dimensions, respectively, the first reflective pattern layers 45A, 45B, and 45C and the second reflective pattern layers 46A, 46B, and 46C of the three reflective sheets 42A, 42B, and 42C are completely overlapped.

Each of the first reflective sheet 42A, the second reflective sheet 42B, and the third reflective sheet 42C of the present embodiment includes the third reflective pattern layers 47A, 47B, and 47C at positions between any two of the second reflective pattern layers 46A, 46B, and 46C around the first reflective pattern layers 45A, 45B, and 45C. The third reflective pattern layers 47A, 47B, and 47C are disposed between the two different second reflective pattern layers 46A, 46B, and 46C among the three second reflective pattern layers 46A, 46B, and 46C such that each of the third reflective pattern layers 47A, 47B, and 47C does not superimpose each other. The third reflective pattern layers 47A, 47B, and 47C have the same distance from the light source region L.

When the first reflective sheet 42A, the second reflective sheet 42B, and the third reflective sheet 42C as described above are stacked, as illustrated in FIG. 5, in each of the unit regions X, the first reflective pattern layers 45A, 45B, and 45C are superimposed at least a position including the light source region L, such that a high reflectance region (an example of a modulation region) in which the reflectance is tripled is formed. Around the high reflectance region, any two of the first reflective pattern layers 45A, 45B, and 45C are superimposed, such that a medium reflectance region (another example of the modulation region) in which the reflectance is doubled is formed. Further, around the medium reflectance region, a low reflectance region (another example of the modulation region) in which the first reflective pattern layers 45A, 45B, and 45C are disposed without being superimposed is formed. Further, around the first reflective pattern layers 45A, 45B, and 45C, the second reflective pattern layers 46A, 46B, and 46C are superimposed, such that the high reflectance region in which the reflectance is tripled is formed. In a similar manner, around the high reflectance region, any two of the second reflective pattern layers 46A, 46B, and 46C are superimposed, such that the medium reflectance region in which the reflectance is doubled and the low reflectance region in which the second reflective pattern layers 46A, 46B, and 46C are disposed without being superimposed are formed. Further, the low reflectance region formed by the third reflective pattern layers 47A, 47B, and 47C is formed between the first reflective pattern layers 45A, 45B, and 45C and the second reflective pattern layers 46A, 46B, and 46C.

Figure 6:
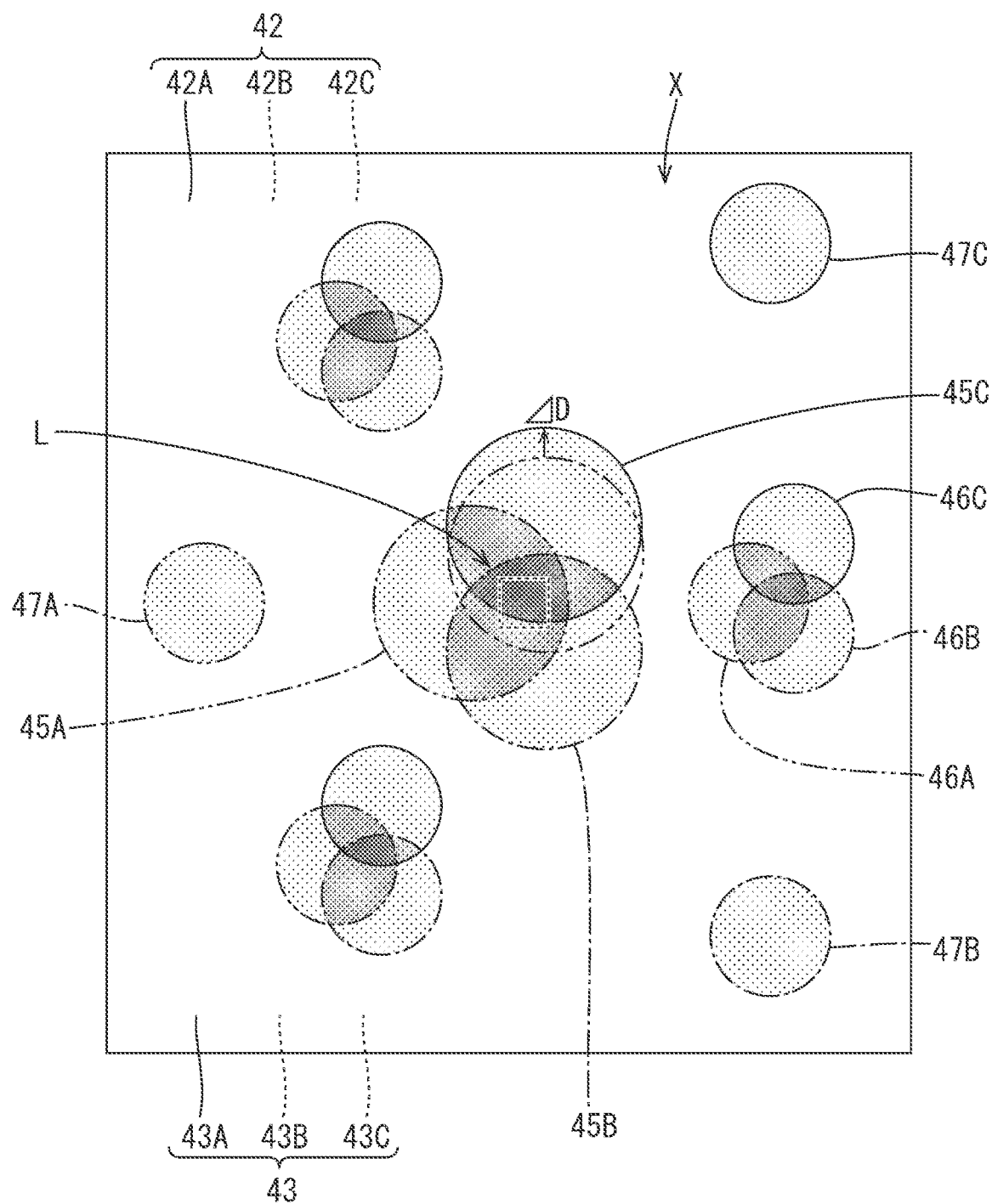
FIG. 6 is a front view illustrating a unit region when one of the three reflective sheets of FIG. 5 is deviated.

When the reflective pattern layer 44 is formed by printing or the like on the reflective sheet 42, the printing position of the reflective pattern layer 44 may be unintentionally deviated. Further, in the backlight device 30, it is conceivable that the mounting position of the reflective sheet 42 with respect to the plurality of LEDs 52 is deviated. Further, it is conceivable that the reflective sheet 42 thermally expands due to the heat generated when the plurality of LEDs 52 are lit, and the position of the reflective sheet 42 with respect to one or the plurality of LEDs 52 is relatively deviated. In the present disclosure, the reflective pattern layer 44 constituting the modulation region is configured to be superimposed on the light source region L and include the light source region L (in other words, to be wider than the light source region L). In such a case, although the position of any one of the reflective sheets 42 is deviated, the light source region L can be suppressed from being misaligned from the reflective pattern layer 44, as illustrated in FIG. 6.

From this point of view, a dimension R from the center to the contour portion (outer shape) of the first reflective pattern layers 45A, 45B, and 45C may be, for example, twice or more a dimension r from the center to the contour portion of the light source region L. The dimension R of the first reflective pattern layers 45A, 45B, and 45C may be, for example, desirably 3 times or more, 4 times or more, 5 times or more, or the like with respect to the dimension r for the light source region L. The dimension R from the center to the contour portion of the reflective pattern layer 44 in the present embodiment is formed to be, for example, about four times as large as the dimension r from the center to the contour portion of the light source region L. For example, the reflective pattern layer 44 may include a reflective pattern layer 44 large enough to suitably absorb the positional deviation that can occur in the plurality of reflective sheets 42. With such a configuration, the effect of alleviating the deviation of the reflective pattern layer 44 (modulation region) with respect to the LED 52 can be enhanced. As a suitable example, for example, when a mini LED (about 300 μm×600 μm) of the above size is used as a light source, the first reflective pattern layers 45A, 45B, and 45C superimposed on the light source region L may desirably have a diameter of 2 mm (2 mm or more), for example, a circular shape of 4 mm (4 mm or more), or a shape including the circular shape. Note that, when the first reflective pattern layers 45A, 45B, and 45C are too large, a dark portion may be formed directly above the light source. Therefore, the maximum dimension of the first reflective pattern layers 45A, 45B, and 45C superimposed on the light source region L from the center to the contour portion may be suppressed to be about the dimension of the unit region X or less.

On the other hand, the second reflective pattern layers 46A, 46B, and 46C and the third reflective pattern layers 47A, 47B, and 47C may have a smaller area than the first reflective pattern layers 45A, 45B, and 45C, and may be disposed to neighbor the first reflective pattern layers 45A, 45B, and 45C. By reducing the area for each of the second reflective pattern layers 46A, 46B, and 46C and the third reflective pattern layers 47A, 47B, and 47C, the pattern layers can be disposed on the reflective sheet 42 with a high occupancy rate. Each of the second reflective pattern layers 46A, 46B, and 46C and the third reflective pattern layers 47A, 47B, and 47C may independently have a diameter (or a minimum outer width) of about 0.1 mm or more and about 1 mm or less (for example, 0.3 mm, 0.5 mm, or the like). Various aspects can be considered for the size and the disposition of the second reflective pattern layers 46A, 46B, and 46C and the third reflective pattern layers 47A, 47B, and 47C, which can be designed with reference to the light reflective pattern (22) disclosed in, for example, Japanese Unexamined Patent Application Publication No. 2019-129066.

The wavelength conversion sheet 48 is an element that wavelength-converts blue light (an example of monochromatic light) emitted from the plurality of LEDs 52 into white light. As illustrated in FIG. 1, the wavelength conversion sheet 48 is disposed closer to the light source than the other optical sheets 49. The wavelength conversion sheet 48 is constituted with a wavelength conversion layer (phosphor film) containing a phosphor (wavelength conversion substance) for wavelength conversion of light from the plurality of LEDs 52, and a protective layer (for example, a protective film made of PC or an acrylic resin) that provides protection by supporting the wavelength conversion layer on one side or both sides thereof. The wavelength conversion layer contains a phosphor that emits secondary light using blue light from the LED 52 as excitation light (first light). The phosphor includes a green phosphor that emits green light as second light and a red phosphor that emits red light as second light. The green phosphor and the red phosphor are a down-conversion type (down-shifting type) that desorbs light having a wavelength longer than the excitation wavelength. The green light referred to here is visible light in a wavelength range belonging to green (about 500 nm to about 570 nm), and red light is visible light in a wavelength range belonging to red (about 600 nm to about 780 nm). Therefore, a portion of the blue light emitted from the LED 52 is wavelength-converted into green light or red light by the green phosphor and the red phosphor contained in the wavelength conversion sheet 48, and by additive color mixing of the wavelength-converted green light and red light (second light) and blue light (first light) of LED 52, the backlight device 30 can emit substantially white light.

Examples of the green phosphor and red phosphor contained in the wavelength conversion layer include an aluminum nitride based phosphor represented by the general formula: $Si_{6-Z}Al_ZO_ZN_{8-Z}$:Eu (satisfying 0<Z<6 in the formula); and the general formula: (Sr, Ca)AlSiN$_3$:Eu, a sulfur-based phosphor represented by the general formula: SrGa$_2$S$_4$:Eu; and the general formula: CaS:Eu, a fluoride-based phosphor represented by the general formula: K$_2$SiF$_6$:Mn, and a quantum dot phosphor represented by ZnSe, InP, or the like. As the phosphor mentioned above, the quantum dot phosphor containing no cadmium is desirable. The quantum dot phosphor has non-contiguous energy mode by confining electrons, holes, and exciters in nano-sized (for example, about 2 nm to 10 nm in diameter) semiconductor crystals, and the quantum size effect makes it possible to appropriately configure the emission wavelength (emission color) by photoluminescence according to the dot size. In the emission by the quantum dot phosphor, since the peak in the emission spectrum is steep and the full width half max (FWHM) is narrow, the color purity can be very high and the color gamut in the liquid crystal display device 10 can be expanded. Further, it is desirable that a pair of protective layers sandwiching the wavelength conversion layer is made of a substantially transparent synthetic resin with a film shape and are excellent in moisture resistance.

The other optical sheet 49 may be various optical sheets except the reflective sheet 42 and wavelength conversion sheet 48. In the present embodiment, as the other optical sheet 49, a first brightness improving sheet 49A and a second brightness improving sheet 49B are provided. Both the first brightness improving sheet 49A and the second brightness improving sheet 49B are also called a brightness enhancement film (BEF), a prism sheet, or the like, and are the element that collects the light that arrives from the LED 52 which is a light source by being transmitted through the reflective sheet 42 and the wavelength conversion sheet 48, toward the user on the front side of the liquid crystal display device 10 and that improves the brightness when the liquid crystal display device 10 is viewed from the front surface. Each of the first brightness improving sheet 49A and the second brightness improving sheet 49B includes a fine prism pattern in which a plurality of unit prisms (for example, a triangular prism), which are made of an acrylic resin having a relatively high refractive index, or the like, are arranged on the surface of a base sheet made of a synthetic resin such as transparent polyester. According to such a prism pattern, the combination of refraction and reflection by each unit prism can cause the arrangement direction of the unit prism to exhibit a selective light collection action on the incident light. As a result, the light incident from the back side of the optical sheet 49 can be emitted in a mode of being collected on the front side. Further, at this time, by making the arrangement directions of the unit prisms in the first brightness improving sheet 49A and the second brightness improving sheet 49B orthogonal to each other, for example, a light collection action is imparted in each of the X-axis direction and the Y-axis direction, and light from the back side can be collected on the front side more efficiently. As illustrated in FIG. 1, the first brightness improving sheet 49A and the second brightness improving sheet 49B may be disposed between the liquid crystal panel 20 and the wavelength conversion sheet 48.

The frame 32 and the chassis 34 are elements to accommodate the LED substrate 50 and the optical sheet 40 and to integrally assemble the liquid crystal panel 20 to the backlight device 30 in cooperation with the bezel 22.

The chassis 34 is a flat, shallow box body having an opening 34A on the front side. On the inner surface of the chassis 34, a step portion G that expands the opening 34A is provided along the opening 34A. The bottom surface of the chassis 34 has a horizontally long rectangular shape corresponding to the LED substrate 50 and the optical sheet 40 when viewed from the front. The LED substrate 50 is fixed to a bottom plate 34B of the chassis 34, for example, by an adhesive sheet.

The frame 32 is a lid member attached to the chassis 34 to cover the opening 34A of the chassis 34 at the peripheral edge of the chassis 34. The frame 32 includes a frame-shaped portion 32B disposed on the front side and having an opening 32A to form a picture-frame shape (frame shape), and a peripheral wall portion 32C extending from the outer edge of the frame-shaped portion 32B toward the back side. A plurality of engaging portions (not illustrated) to fix the optical sheet 40 while the optical sheet 40 is positioned are provided in a pair of facing frame portions (more desirably, any one of the long side frame portions) of the frame-shaped portions 32B. Further, an engaging tab portion (not illustrated) provided with an engaging hole is provided at a position corresponding to the engaging portion in the peripheral edge portion of the optical sheet 40. The engaging hole of the optical sheet 40 can usually be formed to be as large as the clearance with respect to the engaging portion of the frame 32. By inserting the locking protrusion of the chassis 34 into the engaging hole of the optical sheet 40, the optical sheet 40 can be fixed while the optical sheet 40 is positioned on the frame 32. The frame 32 is configured to sandwich the tab portion of the optical sheet 40 with the step portion G.

The bezel 22 is a member to integrally assemble the liquid crystal panel 20 to the backlight device 30. The bezel 22 includes a frame-shaped portion 22B disposed on the front side and having an opening 22A to form a picture-frame shape (frame shape), and a peripheral wall portion 22C extending from the outer edge of the frame-shaped portion 22B toward the back side. The bezel 22 is configured to sandwich the liquid crystal panel 20 with the frame 32 over substantially the entire circumference. As a result, the liquid crystal panel 20 is fixed at a prescribed position with respect to the backlight device 30.

The frame 32, the chassis 34, and the bezel 22 can be constituted with a material excellent in at least one performance of reflection performance, light shielding property, corrosion resistance, and rigidity. Examples of such materials include metal materials such as stainless steel, an aluminum alloy, and electrogalvanized wire, and a synthetic resin material such as white PC. The frame 32, the chassis 34, and the bezel 22 in the present embodiment are constituted with white PC. The liquid crystal panel 20 may be additionally fixed to the frame 32 with, for example, double-sided tape (not illustrated).

The action effect of the backlight device 30 having the above configuration and the liquid crystal display device 10 including the backlight device 30 will be described. The backlight device 30 in the present embodiment includes the plurality of LEDs 52 (light sources) and a plurality of optical sheets 40 disposed to be stacked at a position away from the plurality of LEDs 52. The plurality of optical sheets 40 include the first reflective sheet 42A (first optical sheet), the second reflective sheet 42B (second optical sheet), and the third reflective sheet 42C (third optical sheet). Each of the first reflective sheet 42A, the second reflective sheet 42B, and the third reflective sheet 42C has the unit region X that modulates the light emitted from the LED 52 for each of the plurality of LEDs 52, and the unit region X is the reflective pattern layers 44A, 44B, and 44C (modulation region) including the light source region L facing the LED 52, and includes the reflective pattern layers 44A, 44B, and 44C (modulation region) having a relatively high light reflectance (modulation action) as compared with other regions. The reflective pattern layer 45A (first modulation region), which is a modulation region provided on the first reflective sheet 42A (first optical sheet), and the reflective pattern layer 45B (second modulation region), which is a modulation region provided on the second reflective sheet 42B (second optical sheet), are superimposed on each other at least in the light source region L. Further, the reflective pattern layer 45B, which is a modulation region provided on the second reflective sheet 42B (second optical sheet), and the reflective pattern layer 45C, which is a modulation region provided on the third reflective sheet 42C, are superimposed on each other at least in the light source region L.

According to the above configuration, for example, for each of the first reflective sheet 42A, the second reflective sheet 42B, and the third reflective sheet 42C, a reflective pattern layer (modulation region) having a relatively high reflection action (modulation action) of light is provided in a relatively wide region including the light source region L. As a result, for example, at the time of assembling the backlight device 30, although a position of any one of the first reflective sheet 42A, the second reflective sheet 42B, and the third reflective sheet 42C is deviated with respect to the plurality of LEDs 52 (light sources), the position of the reflective pattern layer 44 of the other reflective sheet 42 is not deviated as illustrated in FIG. 6. Therefore, for example, although the area of the high reflectance region, which is the modulation region, is reduced, the positional deviation of the high reflectance region with respect to the light source region L is suppressed to be small, and the area of the medium reflectance region is increased. As a result, it is possible to suppress the reduction of the light homogenization effect of the plurality of LEDs 52 due to the positional deviation of the one reflective sheet 42. As a result, the light emitted from the light source can be effectively modulated. In addition, although the position of any one of the reflective sheets 42 (optical sheet) is considerably deviated, the light can be modulated by the modulation region of the other reflective sheet 42 (optical sheet), and thus as a whole, it is suppressed that the reflection action (modulation action) of light is considerably reduced. As a result, it is possible to effectively suppress the brightness unevenness caused by the plurality of LEDs 52 (light sources).

Figure 7:
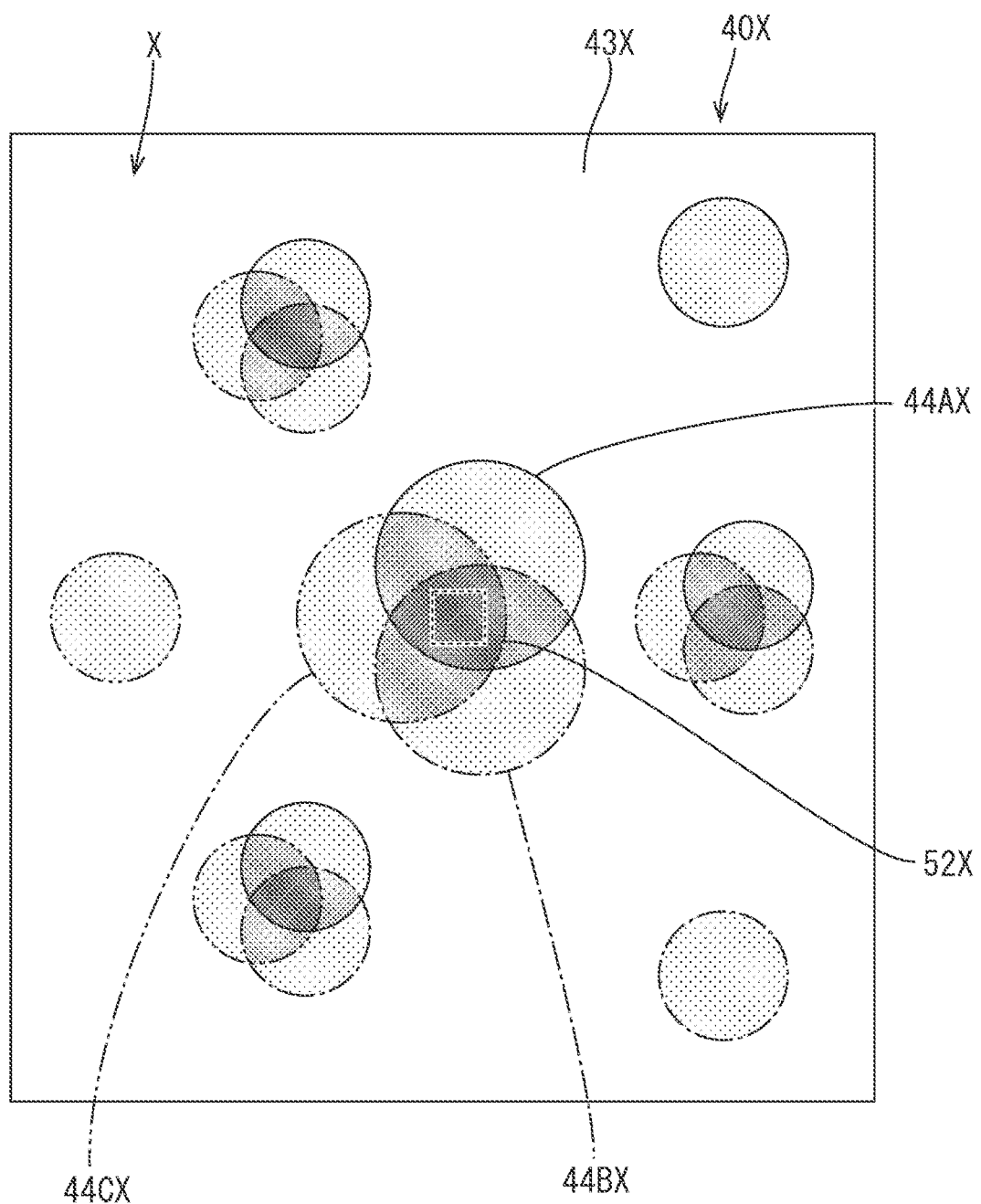
FIG. 7 is a front view illustrating a unit region of a reflective sheet in which a plurality of reflective pattern layers are provided on one base for reference.
Figure 8:
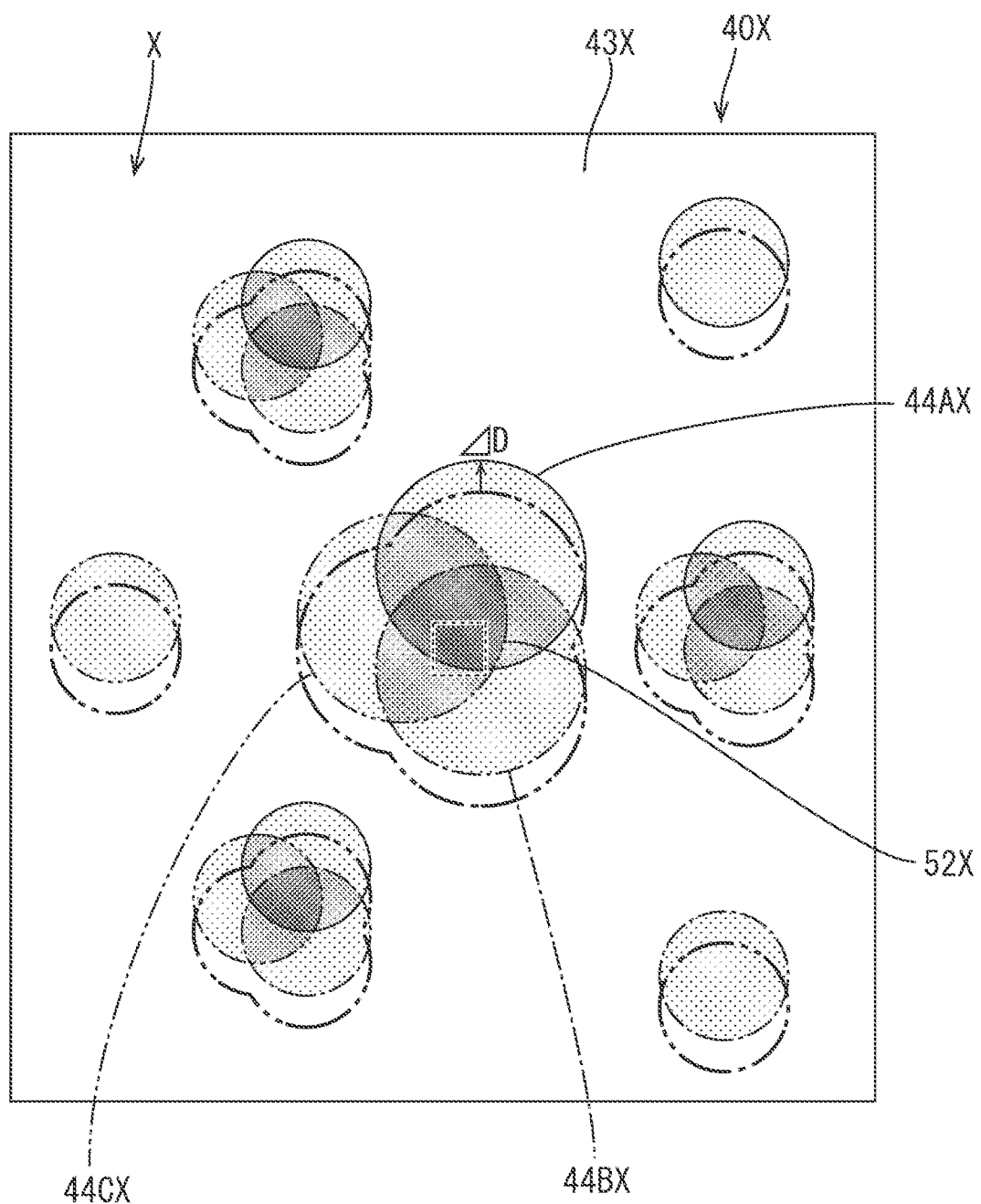
FIG. 8 is a front view illustrating a unit region when the reflective sheet of FIG. 7 is deviated.

For reference, for the reflective sheet 40X of the reference example in which a plurality of reflective pattern layers 44AX, 44BX, and 44CX are provided on one base 43X, FIG. 7 illustrates the unit region X when the reflective sheet 40X does not have positional deviation with respect to a LED 52X, and FIG. 8 illustrates the unit region X when the reflective sheet 40X is deviated with respect to the LED 52X by a deviation amount ΔD, respectively. In a case where the plurality of reflective pattern layers 44AX, 44BX, and 44CX are provided on the one base 43X, since all the reflective pattern layers 44AX, 44BX, and 44CX are deviated together with the base 43X when the reflective sheet 40X has positional deviation, the modulation region is totally deviated with respect to the LED 52X, and when the LED 52X is disposed near the peripheral edge of the modulation region, the relatively strong light emission of the LED 52X is easily transmitted to the front side. On the other hand, when the LED 52X is disposed at a position far away from the peripheral edge of the modulation region, it becomes difficult for the light emission from the LED 52X to be transmitted to the front side. As a result, as compared with the case where the reflective sheet 40X has no positional deviation, a portion in which the brightness is more emphasized and a portion in which the darkness is more emphasized may occur, resulting in brightness unevenness. According to the present disclosure, such an overall deviation of the modulation region can be effectively suppressed.

In the backlight device 30 of the present embodiment, the plurality of reflective sheets 42 (optical sheets) further includes the third reflective sheet 42C (third optical sheet) having the unit region X including the reflective pattern layer 44C (third modulation region), which is a modulation region, for each of the plurality of LEDs 52 (light sources). Further, the reflective pattern layer 45C, which is a modulation region provided on the third reflective sheet 42C, and the reflective pattern layer 45A, which is a modulation region provided on the first reflective sheet 42A, are superimposed on each other at least in the light source region L. According to the above configuration, the light from the plurality of LEDs 52 can be modulated by at least three reflective sheets 42 (optical sheets). Since the ratio of the modulation action borne by the one reflective sheet 42 (optical sheet) is reduced, the reduction of the modulation action of light due to the positional deviation of the one reflective sheet 42 can be suppressed as compared with the case of the two reflective sheets 42. Further, by setting the number of the reflective sheets 42 to three or more, it is possible to increase the possibility that the direction of the positional deviation of each of the reflective sheets 42 exhibits variance, and the positional deviation of the one reflective sheet 42 (optical sheet) can be effectively supplemented with the other reflective sheet 42 (optical sheet). Such an action effect is similarly exerted on any two or three of the reflective sheets 42 (optical sheets) of the plurality of reflective sheets 42 (optical sheets). When there are the plurality (three or more) of reflective sheets 42 (optical sheets), the same effect is exhibited for each of the reflective sheets 42 (optical sheets).

In the backlight device 30 of the present embodiment, the modulation action of light that the first reflective sheet 42A (first optical sheet), the second reflective sheet 42B (second optical sheet), and the third reflective sheet 42C (third optical sheet) include, includes at least one of reflection and scattering of light. In the present embodiment, each of the reflective sheets 42 has modulation actions of both reflection and scattering of light. When a plurality of optical sheets are so-called reflective sheets, by providing a reflective region having a higher reflection action of light than other regions as a modulation region as described above, the reduction of the light reflection effect of the light source can be effectively suppressed although the reflective sheets have positional deviation.

In the backlight device 30 of the present embodiment, the reflective pattern layer 44 constituting the modulation region has a size of twice or more the size of the light source region L. By configuring the modulation region wider than the light source region L in this way, although any of the reflective sheets 42 (optical sheets) have positional deviation, it is possible to suppress the modulation region from deviating from the original light source region L, and the reduction of the modulation action of light can be effectively suppressed.

In the backlight device 30 of the present embodiment, the reflective pattern layer 45A (first modulation region) in the first reflective sheet 42A (first optical sheet) and the reflective pattern layer 45B (second modulation region) in the second reflective sheet 42B (second optical sheet) have the same shape, and are provided at different positions at least within a range in which the light source regions L are superimposed with each other. By disposing the modulation regions having the same shape with deviation in a mode in which the light source regions L are superimposed, the total area of the modulation region can be increased. As a result, the region exhibiting the modulation action of light can be easily expanded. Further, in the region in which the reflective pattern layers 44 (modulation regions) of the reflective sheets 42 overlap, the modulation action of light can be enhanced. As a result, tone can be easily added to the modulation action of light. In other words, gradation can be easily added to the modulation action of light.

In the backlight device 30 of the present embodiment, at least one of the first reflective sheet 42A (first optical sheet), the second reflective sheet 42B (second optical sheet), and the third reflective sheet 42C (third optical sheet) includes, in each of the unit regions X, the second reflective pattern layers 46A, 46B, and 46C and the third reflective pattern layers 47A, 47B, and 47C constituting a sub-modulation region, which is a region having a high modulation action of light, at positions different from the first reflective pattern layers 45A, 45B, and 45C constituting the modulation region including the light source region L. According to such a configuration, the reflective sheet 42 can reflect light by the first reflective pattern layer directly above the light source as well as the second reflective pattern layers 46A, 46B, and 46C and the third reflective pattern layers 47A, 47B, and 47C disposed in a region without the light source. According to the above configuration, more light can be modulated even at a position away from the light source.

In the present embodiment, the thicknesses of the reflective pattern layers 44 in the plurality of reflective sheets 42 are all the same. For example, when the first reflective pattern layers 45A, 45B, and 45C are formed by screen printing, in a case where the thickness of the reflective pattern layer 44 that can be printed by one printing (squeegee operation) is set to a prescribed thickness that enables stable screen printing (for example, 20 μm), the first reflective pattern layers 45A, 45B, and 45C can be stably produced with substantially the same thickness. Then, for example, the thickness of the reflective pattern layer 44 at the portion in which the first reflective pattern layers 45A, 45B, and 45C are superimposed in the light source region L is the total thickness of the plurality of first reflective pattern layers 45A, 45B, and 45C (for example, 60 μm). The total thickness can exceed, for example, the maximum thickness of the print film (for example, 30 μm) that can be printed by one screen printing (squeegee operation). Therefore, according to the present disclosure, it is desirable that the reflective pattern layer 45 having the high modulation action of light can be easily and stably obtained. The thickness of the reflective pattern layer in the plurality of reflective sheets may be different for each of the plurality of reflective sheets.

Figure 9:
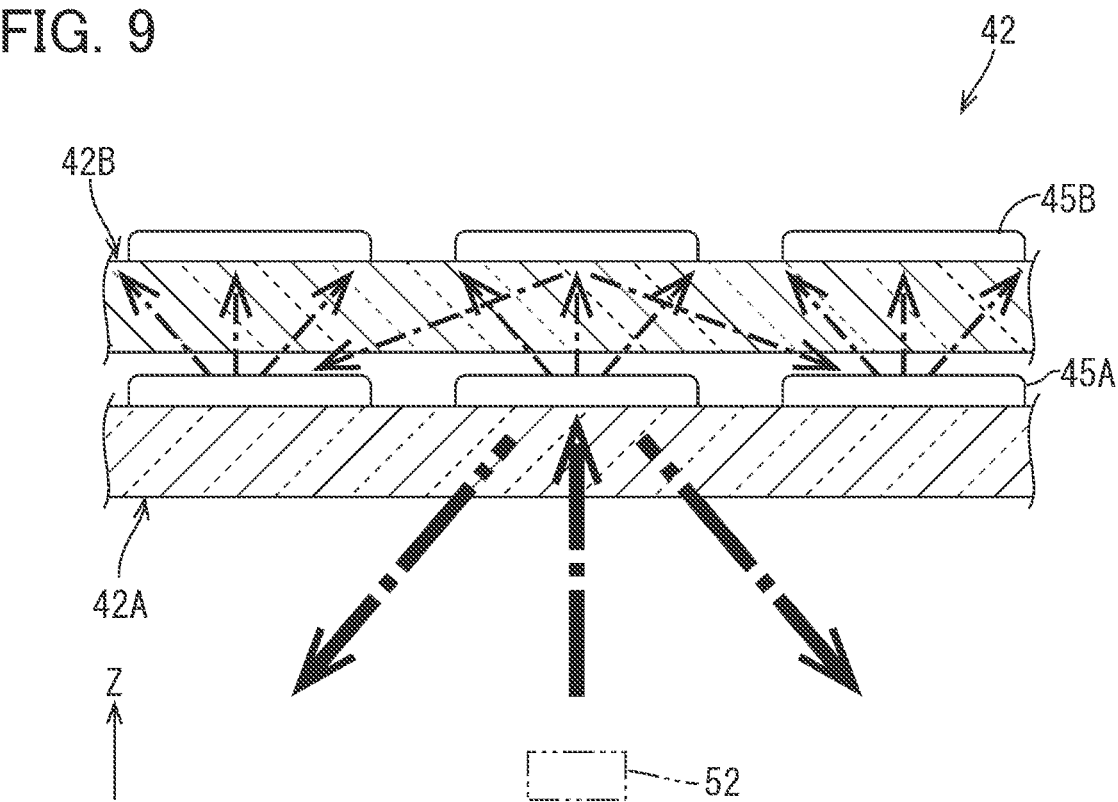
FIG. 9 is a partial cross-sectional view of a first reflective sheet and a second reflective sheet according to an embodiment.

Further, FIG. 9 is a cross-sectional view schematically illustrating only the first reflective sheet 42A (first optical sheet) and the second reflective sheet 42B (second optical sheet) of the present embodiment. In the reflective pattern layers 45A and 45B, a portion of the light that arrives is diffusely reflected and a portion of the light is diffusely transmitted. Therefore, in the region in which the first reflective pattern layer 45A and the second reflective pattern layer 46A are superimposed, a portion of the light that arrives is scattered and reflected between the first reflective pattern layer 45A and the first reflective pattern layer 45B, and propagates in the direction along the sheet surface between the first reflective pattern layer 45A and the first reflective pattern layer 45B. By providing the plurality of reflective sheets 42 in this way, the light that arrives the light source region L can be effectively diffused.

The liquid crystal display device 10 (display device) in the present embodiment includes the lighting device 30 and the display panel 20 that displays an image by using the light emitted from the lighting device 30. The lighting device 30 includes, for example, the plurality of optical sheets 40 including the modulation region including the light source region L, and although any one of the optical sheets 40 has positional deviation, the brightness unevenness due to the plurality of LEDs 52 (light source) can be effectively suppressed.

Second Embodiment

Figure 10:
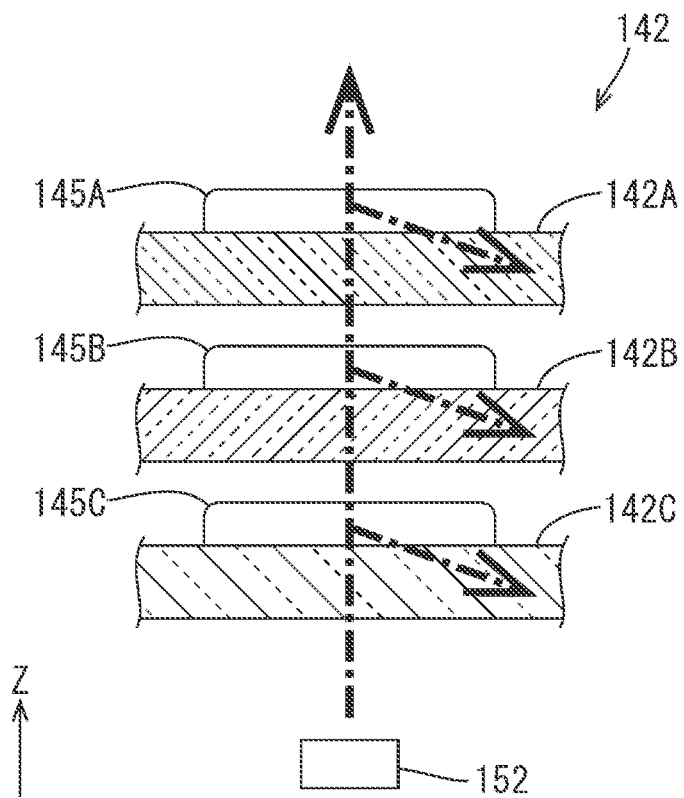
FIG. 10 is a partial cross-sectional view of a reflective sheet according to another embodiment.

In the second embodiment, a reflective sheet 142 (optical sheet) provided in the backlight device will be described. As illustrated in FIG. 10, the reflective sheet 142 includes a first reflective sheet 142A (first optical sheet), a second reflective sheet 142B (second optical sheet), and a third reflective sheet 142C (third optical sheet). A reflective pattern layer 145A constituting the first modulation region in the first reflective sheet 142A, a reflective pattern layer 145B constituting the second modulation region in the second reflective sheet 142B, and a reflective pattern layer 145C constituting the third modulation region in the third reflective sheet 142C have the same shape and size as each other, and are superimposed in the thickness direction as a whole. Other configurations are the same as those in the first embodiment, and the description of overlapping configurations, actions, and effects will be omitted.

In such a configuration, it is very unlikely that the plurality of reflective sheets 142 are all deviated in the same direction with respect to an LED 152. Therefore, although any of the reflective sheets 142 is deviated in either direction, the possibility that the reflective pattern layers 145A, 145B, and 145C are all deviated is very low, and as in the case of the first embodiment, the reduction of the modulation action of light can be suppressed. As a result, the backlight device in which lighting unevenness is unlikely to occur can be configured.

Third Embodiment

Figure 11:
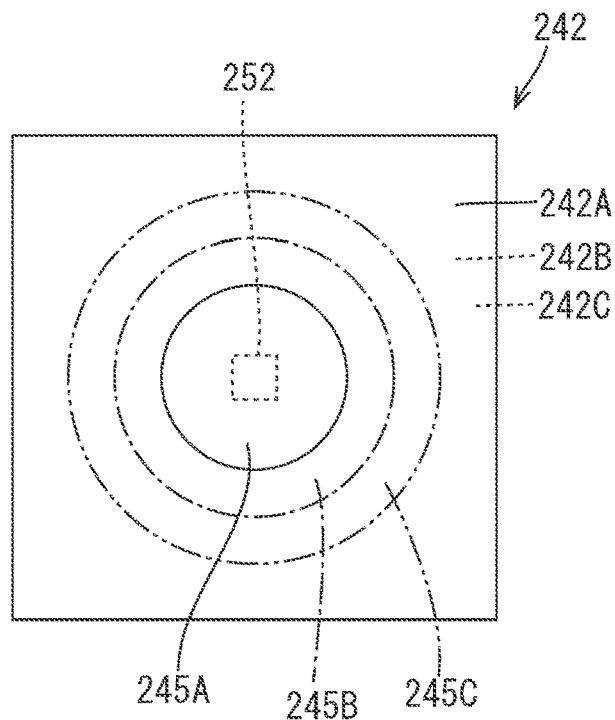
FIG. 11 is a partial cross-sectional view of a reflective sheet according to another embodiment.

In the third embodiment, a reflective sheet 242 (optical sheet) provided in the backlight device will be described. As illustrated in FIG. 11, the reflective sheet 242 includes a first reflective sheet 242A (first optical sheet), a second reflective sheet 242B (second optical sheet), and a third reflective sheet 242C (third optical sheet). A reflective pattern layer 245A constituting the first modulation region in the first reflective sheet 242A, a reflective pattern layer 245B constituting the second modulation region in the second reflective sheet 242B, and a reflective pattern layer 245C constituting the third modulation region in the third reflective sheet 242C have different shapes (sizes) from each other, but all have circular shapes and are alike in shape to each other, such that the centers of the reflective pattern layers are superimposed on each other. The reflective pattern layer 245A, the reflective pattern layer 245B, and the reflective pattern layer 245C are stacked in this order from the front side, and the size of the reflective pattern layers 245A, 245B, and 245C becomes smaller as the reflective sheet 242 closer to the front side. Other configurations may be the same as those of the first and second embodiments, and the description of overlapping configurations, actions and effects will be omitted.

In the reflective sheet 242, when the smaller reflective pattern layers 245A and 245B are superimposed on the larger reflective pattern layers 245B and 245C because the shapes of the reflective pattern layers 245A, 245B and 245C constituting the modulation region are geometrically similar to each other, the modulation action of the entire light can be relatively enhanced at the portion in which the light source regions are superimposed. Further, although each of the reflective pattern layers 245A, 245B, and 245C has different shapes from each other, the centers of the reflective pattern layers are superimposed on each other, such that tone can be easily added to the reflectance (modulation action) of light. In other words, gradation can be easily added to the reflectance of light. Further, each of the reflective pattern layers 245A, 245B, and 245C is disposed in the order in which the area becomes smaller as the distance from an LED 252 increases. Since the LED 252 generates heat when the LED 252 is lit, the reflective sheet 242 (on the back side) closer to the LED 252 tends to more likely have positional deviation. According to such a configuration, since the size of the reflective pattern layer 245C is larger as the reflective sheet 242C closer to the LED 252, the reduction of the reflection action of light is suitably suppressed although the reflective sheet 242C on the side closer to the LED 252 is deviated due to the heat generation of the LED 252.

Fourth Embodiment

Figure 12:
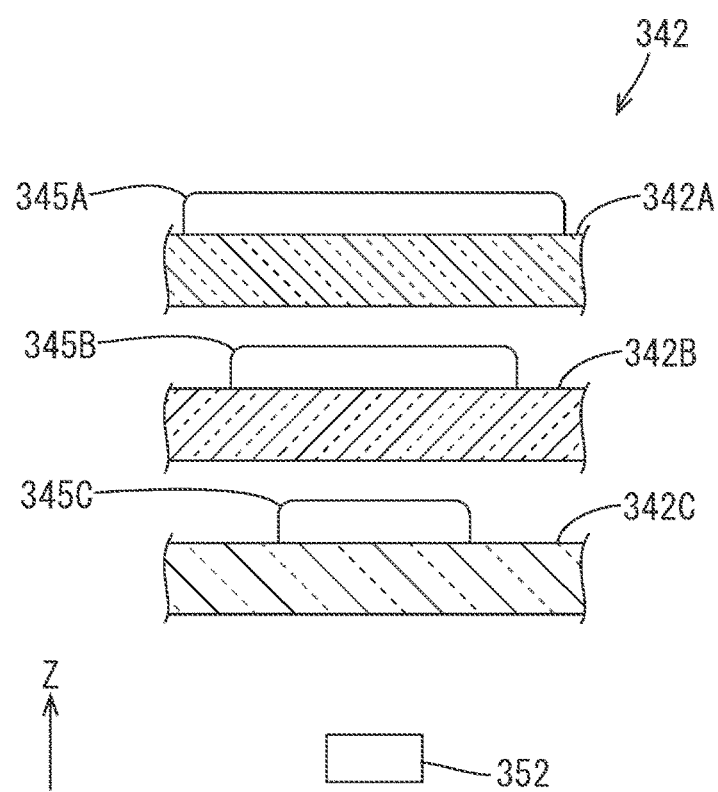
FIG. 12 is a partial cross-sectional view of a reflective sheet according to another embodiment.

In the fourth embodiment, a reflective sheet 342 (optical sheet) provided in the backlight device will be described. As illustrated in FIG. 12, the reflective sheet 342 includes a first reflective sheet 342A (first optical sheet), a second reflective sheet 342B (second optical sheet), and a third reflective sheet 342C (third optical sheet). A reflective pattern layer 345A constituting the first modulation region in the first reflective sheet 342A, a reflective pattern layer 345B constituting the second modulation region in the second reflective sheet 342B, and a reflective pattern layer 345C constituting the third modulation region in the third reflective sheet 342C have different shapes (sizes) from each other, but all have circular shapes and are alike in shape to each other, such that the centers of the reflective pattern layers are superimposed on each other. The reflective pattern layer 345A of the first reflective sheet 342A, the reflective pattern layer 345B of the second reflective sheet 342B, and the reflective pattern layer 345C of the third reflective sheet 342C are stacked in this order from the front side, and as the reflective sheet 342 is closer to the front side, the size of the reflective pattern layers 345A, 345B, and 345C becomes larger. Other configurations may be the same as those of the first to third embodiments, and the description of overlapping configurations, actions and effects will be omitted.

In the reflective sheet 342, the shapes of the reflective pattern layers 345A, 345B and 345C constituting the modulation region are geometrically similar to each other, and thus when the larger reflective pattern layers 345A and 345B are superimposed on the smaller reflective pattern layers 345B and 345C, the modulation action of the entire light can be relatively enhanced at the portion in which the light source region L is superimposed. Further, although each of the reflective pattern layers 345A, 345B, and 345C has different shapes from each other, the centers of the reflective pattern layers are superimposed on each other, such that tone can be easily added to the reflectance (modulation action) of light. In other words, gradation can be easily added to the reflectance of light. Further, each of the reflective pattern layers 345A, 345B, and 345C is disposed in the order in which the area becomes larger as the distance from an LED 352 increases. As the reflective sheet 342 is distanced from the LED 352, the light emitted from the LED 352 is diffused, such that the more light can be effectively reflected because the area of the reflective pattern layer 345A is large as the reflective pattern layer 345A is far from the LED 352. With such a configuration, the light from the LED 352 can be effectively diffused.

Fifth Embodiment

Figure 13:
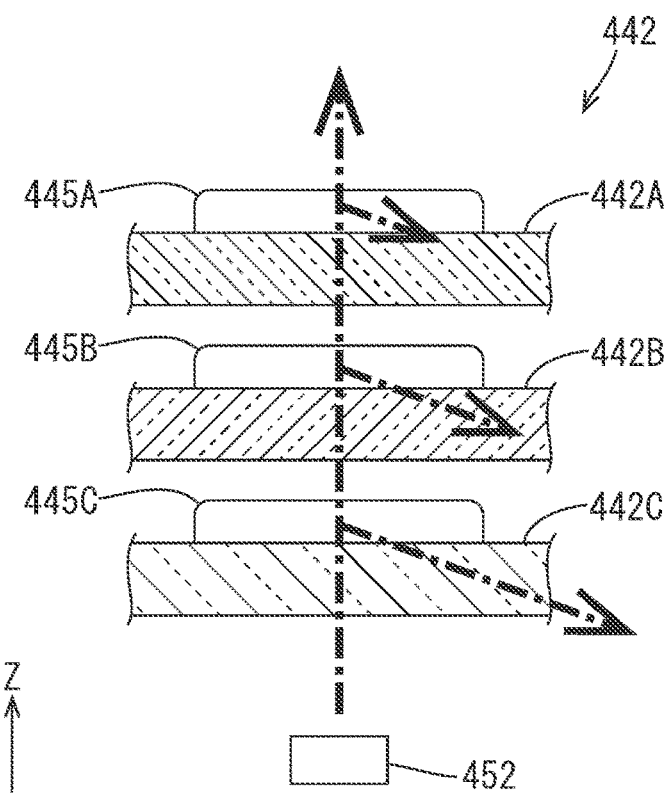
FIG. 13 is a partial cross-sectional view of a reflective sheet according to another embodiment.

In the fifth embodiment, a reflective sheet 442 (optical sheet) provided in the backlight device will be described. As illustrated in FIG. 13, the reflective sheet 442 includes a first reflective sheet 442A (first optical sheet), a second reflective sheet 442B (second optical sheet), and a third reflective sheet 442C (third optical sheet). A reflective pattern layer 445A constituting the first modulation region in the first reflective sheet 442A, a reflective pattern layer 445B constituting the second modulation region in the second reflective sheet 442B, and a reflective pattern layer 445C constituting the third modulation region in the third reflective sheet 442C have the same shape (size) as each other, and the centers of the reflective pattern layers are superimposed on each other. The reflective pattern layer 445A of the first reflective sheet 442A, the reflective pattern layer 445B of the second reflective sheet 442B, and the reflective pattern layer 445C of the third reflective sheet 442C are stacked in this order from the front side, and as the reflective sheet 442 is closer to the front side, the refractive index of the reflective pattern layers 445A, 445B, and 445C becomes smaller. The refractive index may be adjusted, for example, by forming each of the reflective pattern layers 445A, 445B, and 445C by supplying (for example, printing) resin inks having different refractive indexes. Other configurations may be the same as those of the first to fourth embodiments, and the description of overlapping configurations, actions and effects will be omitted.

Since the reflective pattern layer 445C close to the LED 452 has a higher density (luminous flux) of the light arriving from the LED 452, more light can be reflected (modulated) in a small area. In addition to the above-mentioned, according to the above configuration, since the refractive index of the reflective pattern layer 445C close to the LED 452 is larger, more light can be diffused greatly. As a result, the light from the LED 452 can be effectively diffused.

Other Embodiments

The present disclosure is not limited to the embodiments described above and the drawings, and for example, the following embodiments are also included in the technical scope of the present disclosure.

(1) In the above embodiment, the light source is an LED. However, the light source is not limited to the LED, and the present disclosure can be desirably applied when a light source having strong directivity is adopted. Further, the LED is not limited to the mini LED, and an LED having a larger dimension, an LED having a smaller dimension (for example, a micro LED) or the like may be used. Further, the wavelength range of the first light emitted by the LED 52 is not limited to the blue wavelength region, and a single color other than blue may be emitted. In that case, the wavelength conversion material included in the wavelength conversion sheet 48 can be appropriately selected such that the first light emitted by the LED 52 can be converted into white.

(2) In the above embodiment, each of the plurality of light sources includes one LED (light emitting element). However, each of the plurality of light sources may include two or more locally disposed light emitting elements. In other words, when two or more light emitting elements are locally disposed, for example, in one package, this can be regarded as one light source.

(3) In the first embodiment, the plurality of LEDs 52 (light sources) are arranged along the vertical direction and the horizontal direction of the substrate 54. However, the arrangement mode of the plurality of LEDs 52 is not limited thereto, and may be any direction in the plane of the substrate 54. The plurality of LEDs 52, for example, may be arranged in other modes such as a staggered arrangement and a hexagonal grid arrangement as long as the plurality of LEDs 52 are uniformly disposed on the mounting surface of the substrate 54.

(4) In the first embodiment, the substrate 54 includes the reflective layer 56 on the front side surface. However, the configuration of the substrate 54 is not limited to the example, and for example, the substrate 54 may have a white glass epoxy resin layer exposed on the front side surface. The white glass epoxy resin layer can also have the effect of reflecting the light arriving from the LED to the front side.

(5) In the first embodiment, the LED substrate 50 includes the plurality of LEDs 52 on the substrate 54, and the surface of the plurality of LEDs 52 is exposed. However, the configuration of the LED substrate 50 is not limited to the example, and for example, the LED substrate 50 may include a transparent protective layer on at least a portion of the front side surface. The transparent protective layer may be provided to cover a portion or all of the plurality of LEDs 52 and the substrate 54 from the front side. The transparent protective layer is desirably constituted with a resin or the like having a high refractive index because the light emission rate from the plurality of LEDs 52 can be increased and more light can be incident on the optical sheet 40. As such a resin material, for example, a high refractive index resin material having a refractive index exceeding 1 (for example, 1.2 or more, 1.4 or more) such as silicon resin, PET, acrylic resin, or the like is given as a desirable example. When the transparent protective layer is provided on the entire surface of the LED substrate 50, for example, the transparent protective layer may be formed by adopting a resin molding method, or the transparent resin in a sheet shape may be attached to the LED substrate 50 by using OCA. When the transparent protective layer is provided on a portion of the front side surface of the LED substrate 50, for example, a resin potting method may be adopted.

(6) In the first embodiment, the wavelength conversion sheet 48 uses a protective film as a protective layer that supports the wavelength conversion layer. The configuration of the wavelength conversion sheet 48 is not limited to the example, and for example, the wavelength conversion layer may be supported by a dichroic filter on the back side (light source side).

(7) In the first embodiment, the two prism sheets 49A and 49B having the same configuration are used, and one of the prism sheets 49A and 49B is disposed to be rotated by 90° such that the prism directions are orthogonal to each other. However, only one of the prism sheets 49A and 49B may be provided, or two or more pairs of prism sheets 49A and 49B may be used. Further, another optical sheet may be disposed between a pair of prism sheets 49A and 49B.

(8) In the first embodiment, the other optical sheets 49 are the prism sheets 49A and 49B. However, as the other optical sheet 49, various known optical sheets can be used in addition to the prism sheets 49A and 49B or in place of the prism sheets 49A and 49B. Examples of such an optical sheet include a reflective polarizing sheet, a dichroic filter, a scattering sheet, a direction turning film (DTF), or the like.

The reflective polarizing sheet can have a multilayer thin film structure in which polarizing thin films are laminated, inhibit loss of light absorbed by the lower polarizing plate of the liquid crystal panel 20, and enhance the brightness of the liquid crystal display device 10 without hindering the viewing angle. As the reflective polarizing sheet, for example, a dual brightness enhancement film (DBEF) manufactured by Sumitomo 3M Ltd. can be desirably used.

A dichroic filter is an optical filter that reflects light in a specific wavelength range and transmits light in the remaining wavelength range. Examples of the dichroic filter include a filter that reflects blue light and transmits yellow light, a filter that reflects yellow light and transmits blue light, or the like. The dichroic filter may be disposed, for example, on the side of the light source as compared with the wavelength conversion layer of the wavelength conversion sheet 48. The dichroic filter may be fixed to the protective layer on the side of the light source of the wavelength conversion sheet 48 via OCA. The dichroic filter may be disposed as an independent sheet. The DTF is a kind of diffuser plate also called a light emission direction control film, and can change the optical axis of the light transmitted through the film. The scattering sheet is an optical sheet having a light diffusing action on the entire surface. The direction turning film (DTF) is an optical sheet having an action of turning light incident on the film at a prescribed angle with respect to the optical axis and emitting the light.

(9) In the first embodiment, the base 43 of the reflective sheet 42 does not bring about a relevant optical action on the light emitted by the LED 52. However, the base 43 of the reflective sheet 42 may bring about a relevant optical action on the light emitted by the LED 52, and for example, may be any one or a combination of two or more of the other optical sheets 49 described above. As a result, the number and thickness of the optical sheets can be suppressed, and the light emitted from the light source can be efficiently modulated directly above the light source.

(10) In the fifth embodiment, the refractive indexes of the reflective pattern layers 445A, 445B, and 445C are smaller as the reflective sheet 442 is closer to the front side. However, the refractive indexes of the reflective pattern layers 445A, 445B, and 445C may be increased as the reflective sheet is closer to the front side. According to such a configuration, the light more diffused away from the LED 452 can be diffusely reflected by the reflective pattern layer 445A having a high reflectance. As a result, the degree of diffusion of light by the reflective pattern layers 445A, 445B, and 445C is less likely to be uneven, and the light from the LED can be made more uniform.

(11) Further, in the fifth embodiment, the refractive indexes of the reflective pattern layers 445A, 445B, and 445C are adjusted by using resin inks having different refractive indexes. However, the reflectance of the resin ink used for forming the reflective pattern layers 445A, 445B, and 445C may be adjusted. The resin ink may be adjusted in either or both of the refractive index and the reflectance. The reflectance of the resin ink may be adjusted, for example, by changing the type and size of the pigment dispersed in the ink. As the pigment, fine silica particles or particles having a metallic luster (for example, mica or the like) may be used. The resin ink can form a reflective pattern having a high reflectance by adopting a resin ink containing a pigment at a high concentration. However, a reflective pattern having a high reflectance may be formed by adopting a resin ink containing a pigment at a relatively low concentration and performing stacked printing.

Figure 14:
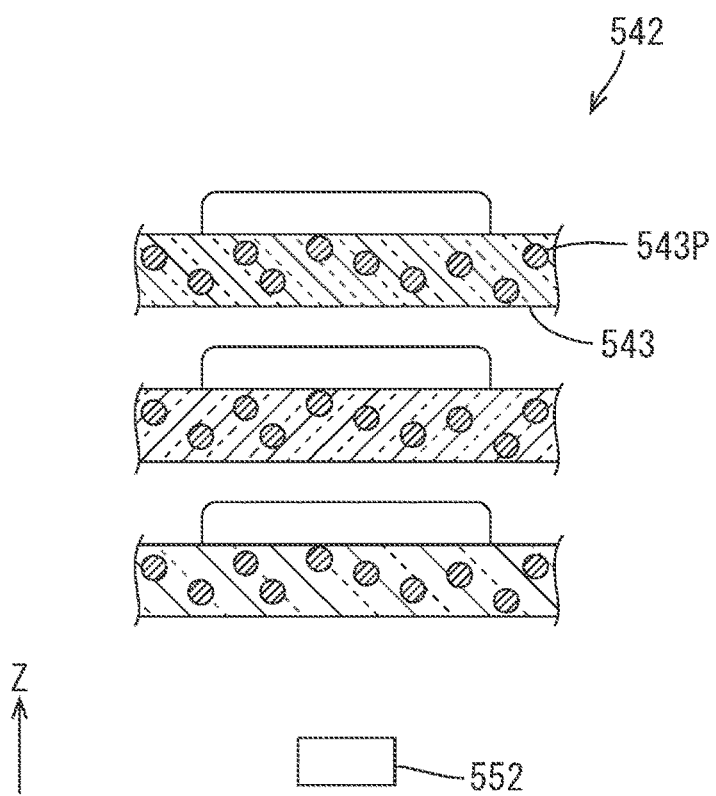
FIG. 14 is a partial cross-sectional view of a reflective sheet according to another embodiment.
Figure 15:
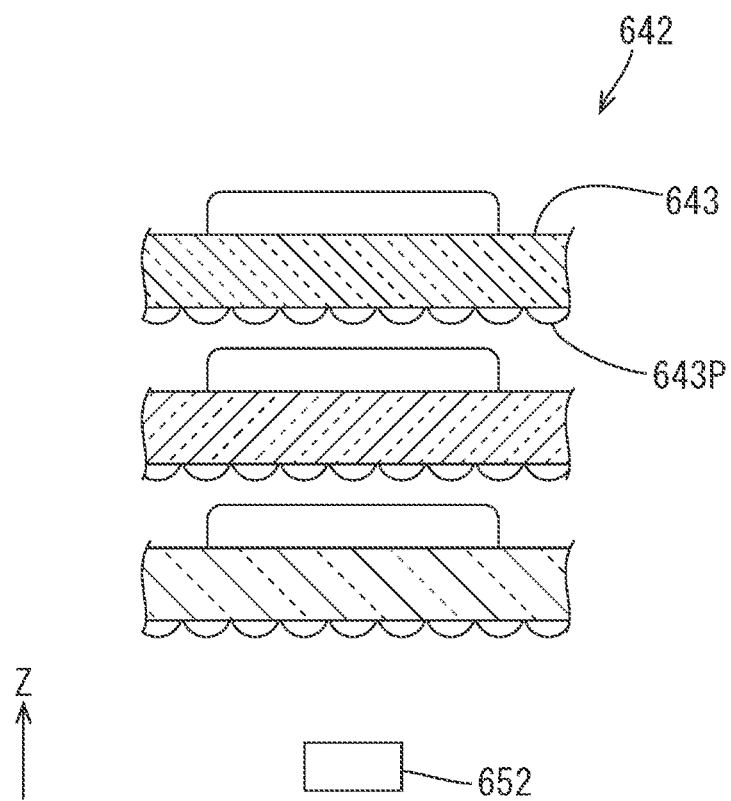
FIG. 15 is a partial cross-sectional view of a reflective sheet according to another embodiment.
Figure 16:
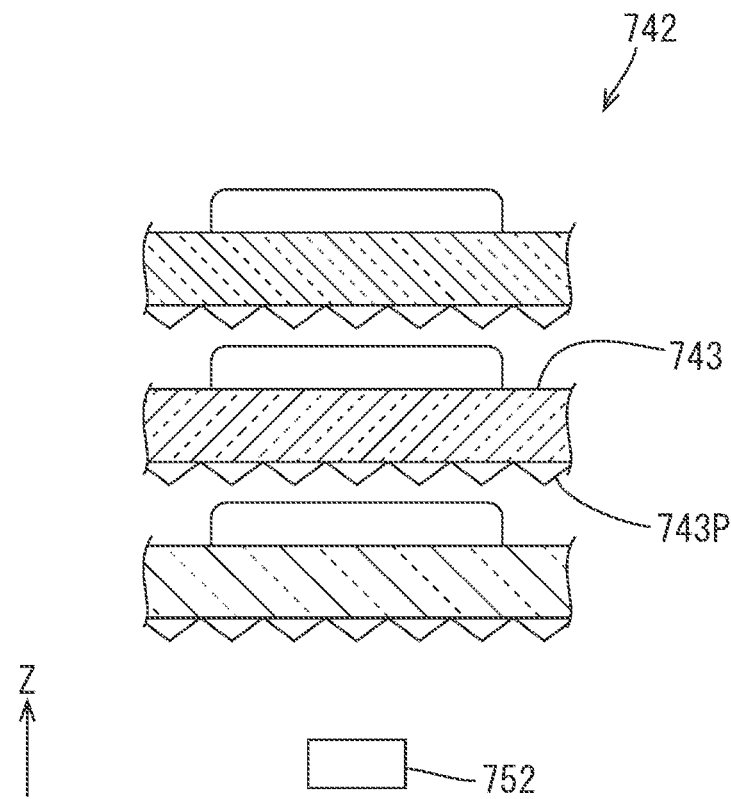
FIG. 16 is a partial cross-sectional view of a reflective sheet according to another embodiment.

(12) In the above embodiment, the base 43 of the reflective sheet 42 is constituted with a highly permeable material. Further, the base 43 is in a sheet shape having a uniform thickness. However, the mode of the base of the reflective sheet is not limited thereto. As illustrated in FIG. 14, for example, a base 543 of a reflective sheet 542 may be configured with a synthetic resin sheet (an example of a diffuser sheet) having a light scattering property by containing diffuse particles 543P having a refractive index different from the refractive index of the base 543. Further, as illustrated in FIG. 15, a base 643 of a reflective sheet 642, for example, may be provided with hemispherical uneven portions 643P arranged on the back side surface of the base 643. Further, as illustrated in FIG. 16, a base 743 of a reflective sheet 742, for example, may be provided with triangular columnar prisms 743P arranged on the back side surface of the base 743. As the prism 743P, semi-cylindrical lenticular lenses may be arranged. Further, in the reflective sheet, the modulation pattern may be formed by subjecting a position corresponding to the modulation region on at least one surface of the front side and the back side of the base of the reflective sheet to processing (for example, roughening processing such as breast processing and laser processing). The modulation pattern is configured to have the action of modulating the light emitted from the light source. By making the bases 543, 643, and 743 of the reflective sheets 542, 642, and 742 in such a configuration, although the reflective sheets 542, 642, and 742 are deviated, the occurrence of unevenness of the light from the light sources 552, 652, and 752 can be suppressed.

The present disclosure contains subject matter related to that disclosed in Japanese Priority Patent Application JP 2021-192675 filed in the Japan Patent Office on Nov. 29, 2021, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A lighting device comprising:
a plurality of light sources; and
a plurality of optical sheets disposed to be stacked at a position away from the plurality of light sources, wherein
the plurality of optical sheets includes a first optical sheet and a second optical sheet,
each of the first optical sheet and the second optical sheet has a unit region that modulates light emitted from a corresponding light source in the plurality of light sources,
each unit region includes a modulation region including a light source region that faces the corresponding light source and that has a relatively high modulation action of the light compared to regions other than the modulation region in each unit region,
a first modulation region, which is the modulation region provided on the first optical sheet, and a second modulation region, which is the modulation region provided on the second optical sheet, are superimposed at least in the light source regions of each other,
the plurality of optical sheets further includes a third optical sheet that has a plurality of unit regions including a third modulation region, which has a same function as the modulation region, associated with each of the plurality of light sources, and
the third modulation region provided on the third optical sheet includes a light source region that overlaps a light source region of the first modulation region of the first optical sheet and a light source region of the second modulation region of the second optical sheet when aligned with the plurality of light sources.

2. The lighting device according to claim 1, wherein a modulation action of light included in the first optical sheet and the second optical sheet includes at least one of a reflection and a scattering of light.

3. The lighting device according to claim 1, wherein the modulation region has a size equal to or more than twice a size of the light source region.

4. The lighting device according to claim 1, wherein the first modulation region in the first optical sheet and the second modulation region in the second optical sheet have the same shape and position.

5. The lighting device according to claim 1, wherein the first modulation region in the first optical sheet and the second modulation region in the second optical sheet have the same shape and are provided at least at different positions within a range in which the light source regions of each other are superimposed.

6. The lighting device according to claim 1, wherein the first modulation region in the first optical sheet and the second modulation region in the second optical sheet are similar in shape, and a relatively small modulation region is superimposed on a relatively large modulation region.

7. The lighting device according to claim 1, wherein the first optical sheet is disposed at a position closer to the plurality of light sources than the second optical sheet, and
the first modulation region in the first optical sheet has a configuration that makes a corresponding modulation action higher compared to a modulation action corresponding to the second modulation region in the second optical sheet.

8. The lighting device according to claim 1, wherein both the first optical sheet and the second optical sheet include a base, and
a modulation pattern is provided at a position corresponding to a modulation region of the base, the modulation pattern modulating the light emitted from the corresponding light source.

9. A display device comprising:
the lighting device according to claim 1; and
a display panel that displays an image using light emitted from the lighting device.

10. A lighting device comprising:
a plurality of light sources; and
a plurality of optical sheets disposed to be stacked at a position away from the plurality of light sources, wherein
the plurality of optical sheets includes a first optical sheet and a second optical sheet,
each of the first optical sheet and the second optical sheet has a unit region that modulates light emitted from a corresponding light source in the plurality of light sources,
each unit region includes a modulation region including a light source region that faces the light source and that has a relatively high modulation action of the light compared to regions other than the modulation region in each unit region,
a first modulation region, which is the modulation region provided on the first optical sheet, and a second modulation region, which is the modulation region provided on the second optical sheet, are superimposed at least in the light source regions of each other, and
at least one of the first optical sheet and the second optical sheet includes a sub-modulation region, which is a region having a high modulation action of the light, provided at a position different from the modulation region in each unit region.

11. The lighting device according to claim 10, wherein the plurality of optical sheets further includes a third optical sheet that has a plurality of unit regions including a third modulation region, which has a same function as the modulation region, associated with each of the plurality of light sources, and the third modulation region provided on the third optical sheet further includes a light source region that overlaps a light source region of the first modulation region of the first optical sheet and a light source region of the second modulation region of the second optical sheet when aligned with the plurality of light sources.

12. The lighting device according to claim 10, wherein a modulation action of light included in the first optical sheet and the second optical sheet includes at least one of a reflection and a scattering of light.

13. The lighting device according to claim 10, wherein the modulation region has a size equal to or more than twice a size of the light source region.

14. The lighting device according to claim 10, wherein the first modulation region in the first optical sheet and the second modulation region in the second optical sheet have the same shape and position.

15. The lighting device according to claim 10, wherein the first modulation region in the first optical sheet and the second modulation region in the second optical sheet have the same shape and are provided at least at different positions within a range in which the light source regions of each other are superimposed.

16. The lighting device according to claim 10, wherein the first modulation region in the first optical sheet and the second modulation region in the second optical sheet are similar in shape, and a relatively small modulation region is superimposed on a relatively large modulation region.

17. The lighting device according to claim 10, wherein the first optical sheet is disposed at a position closer to the plurality of light sources than the second optical sheet, and the first modulation region in the first optical sheet has a configuration that makes a corresponding modulation action higher compared to a modulation action corresponding to the second modulation region in the second optical sheet.

18. The lighting device according to claim 10, wherein both the first optical sheet and the second optical sheet include a base, and a modulation pattern is provided at a position corresponding to the modulation region of the base, the modulation pattern modulating the light emitted from the light source.

19. A display device comprising:
the lighting device according to claim 10; and
a display panel that displays an image using light emitted from the lighting device.

* * * * *